(12) United States Patent
Adolfsson et al.

(10) Patent No.: US 10,810,064 B2
(45) Date of Patent: Oct. 20, 2020

(54) PUBLISH-SUBSCRIBE FRAMEWORK FOR APPLICATION EXECUTION

(71) Applicant: Nasdaq Technology AB, Stockholm (SE)

(72) Inventors: Robert Adolfsson, Vega (SE); Daniel Hilton, Malmo (SE)

(73) Assignee: Nasdaq Technology AB, Stockholm (SE)

( * ) Notice: Subject to any disclaimer, the term of this patent is extended or adjusted under 35 U.S.C. 154(b) by 0 days.

(21) Appl. No.: 16/394,109

(22) Filed: Apr. 25, 2019

(65) Prior Publication Data
US 2019/0332449 A1 Oct. 31, 2019

Related U.S. Application Data
(60) Provisional application No. 62/663,422, filed on Apr. 27, 2018.

(51) Int. Cl.
*G06F 3/00* (2006.01)
*G06F 9/54* (2006.01)

(52) U.S. Cl.
CPC .............. *G06F 9/546* (2013.01); *G06F 9/544* (2013.01)

(58) Field of Classification Search
CPC ....................................................... G06F 9/542
USPC .......................................................... 719/318
See application file for complete search history.

(56) References Cited

U.S. PATENT DOCUMENTS

| | | | | |
|---|---|---|---|---|
| 7,822,728 B1* | 10/2010 | Chandler | ............ | G06F 16/1774 707/704 |
| 2009/0132671 A1* | 5/2009 | Chkodrov | ............... | H04L 51/00 709/206 |
| 2012/0284331 A1* | 11/2012 | Kambatla | .............. | G06Q 10/06 709/204 |
| 2014/0019729 A1* | 1/2014 | Pell | ..................... | G06F 15/8053 712/225 |

(Continued)

FOREIGN PATENT DOCUMENTS

EP 3 128 423 A1 2/2017

OTHER PUBLICATIONS

Michael D. Young, Integrating the ODI-PPA scientific gateway with the QuickReduce pipeline for on-demand processing. (Year: 2014).*

(Continued)

*Primary Examiner* — Lechi Truong
(74) *Attorney, Agent, or Firm* — Nixon & Vanderhye, P.C.

(57) ABSTRACT

The described technology relates to a publish-subscribe message framework in which an application, decomposed to a plurality of processing stages, is run by executing respective processing stages of the application asynchronously and simultaneously with each other. Communications between the respective processing stages may exclusively be in accordance with the publish-subscribe execution model. The described publish-subscribe framework provides for processing stages to be executed in a multi-process and/or multi-threaded manner while also enabling the distribution of the processing stages to respective processing resources in a multi-processor/multi-core processing environment. An example electronic exchange application and a corresponding example exchange gateway application are described.

16 Claims, 13 Drawing Sheets

(56) References Cited

U.S. PATENT DOCUMENTS

2014/0359145 A1 12/2014 Metzler et al.
2017/0118666 A1* 4/2017 Patel .................... H04W 76/25

OTHER PUBLICATIONS

PCT International Search Report in corresponding Application No. PCT/EP2019/060728 dated Jun. 24, 2019.
Eugster et al., The Many Faces of Publish/Subscribe, ACM Computing Surveys, vol. 35, No. 2, Jun. 2003, pp. 114-131.
International Preliminary Report on Patentability issued in the corresponding PCT Application No. PCT/EP2019/060728 dated May 14, 2020, (28 pages).

* cited by examiner

PUBLISH-SUBSCRIBE FRAMEWORK FOR APPLICATION EXECUTION

CROSS-REFERENCE TO RELATED APPLICATIONS

This application claims priority to U.S. Provisional Patent Application 62/663,422 filed on Apr. 27, 2018, the entire content of which is incorporated herein by reference.

TECHNICAL OVERVIEW

The technology described relates to a publish-subscribe framework that facilitates asynchronous simultaneous execution of components of an application, such as, for example, an electronic exchange application for equities and other tradable instruments.

BACKGROUND

Speeding up applications is an ever-present goal for application architects, programmers, and hardware engineers. The faster an application can complete its execution from start to finish, the efficiency of the application and of the hardware resources is improved. Numerous hardware improvements have been made for the express purpose of making instruction execution on computers faster. Software design, compilation and execution have all also progressed to speed up execution. Many techniques are known for designing applications in order to achieve some level of speedup.

In some well-known techniques of architecting software for application programs, an application is decomposed into a number of processing stages where each stage receives a set of messages (ingress messages) as input, performs some processing using the received input messages, and produces another set of messages (egress messages) as output. This type of processing is similar to approaches in event- or message-driven systems where applications are designed to have a "main loop" with an associated queue of "events" which are typically processed in the order they are queued. However, the "main loop" may not offer the best speedup up under some circumstances.

Therefore, more new and useful techniques for speeding up application execution are sought.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

SUMMARY

The described technology relates to a publish-subscribe message framework in which an application, decomposed to a plurality of processing stages, is run by executing respective processing stages of the application asynchronously and simultaneously with each other. Communications between the respective processing stages may exclusively be in accordance with the publish-subscribe execution model. The described publish-subscribe framework provides for processing stages to be executed in a multi-process and/or multi-threaded manner while also enabling the distribution of the processing stages to respective processing resources in a multi-processor/multi-core processing environment.

According to an embodiment, an electronic exchange system is provided. The electronic exchange system comprises a shared memory, a communication infrastructure, and a processing system comprising a plurality of processing resources coupled by the communication infrastructure to the shared memory. The processing system is configured to execute at least one pipeline processing stage of a plurality of pipeline stages of a processing pipeline of an application on each of the processing resources, provide for communication between any two of the plurality of pipeline stages via publish-subscribe messages using the shared memory, in response to a received data message complete processing of the data message in the application by processing the data message in an asynchronously and simultaneously executing plurality of the pipeline stages to generate an output message, and transmit the output message.

According to another embodiment, a method of processing a data message on an electronic exchange system is provided. The electronic exchange system has a shared memory, a communication infrastructure and a processing system comprising a plurality of processing resources coupled by the communication infrastructure to the shared memory. The method includes executing, on each of the processing resources, at least one pipeline processing stage of a plurality of pipeline stages of a processing pipeline of an application; providing for communication between any two of the plurality of pipeline stages via publish-subscribe messages using the shared memory; in response to a received data message, completing processing of the data message in the application by processing the data message in an asynchronously and simultaneous executing plurality of the pipeline stages to generate an output message; and transmitting the output message.

According to another embodiment, a non-transitory computer-readable storage medium is provided. The storage medium stores instructions which, when executed by a processing system comprising a plurality of processing resources coupled by a communication infrastructure to a shared memory, causes the processing system of an electronic exchange system to perform operations comprising: executing, on each of the processing resources, at least one pipeline processing stage of a plurality of pipeline stages of a processing pipeline of an application; providing for communication between any two of the plurality of pipeline stages via a publish-subscribe messages using the shared memory; in response to a received data message, completing processing of the data message in the application by processing the data message in an asynchronously and simultaneously executing plurality of the pipeline stages to generate an output message; and transmitting the output message.

This summary is provided to introduce a selection of concepts in a simplified form that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

DETAILED DESCRIPTION

Figure 1:
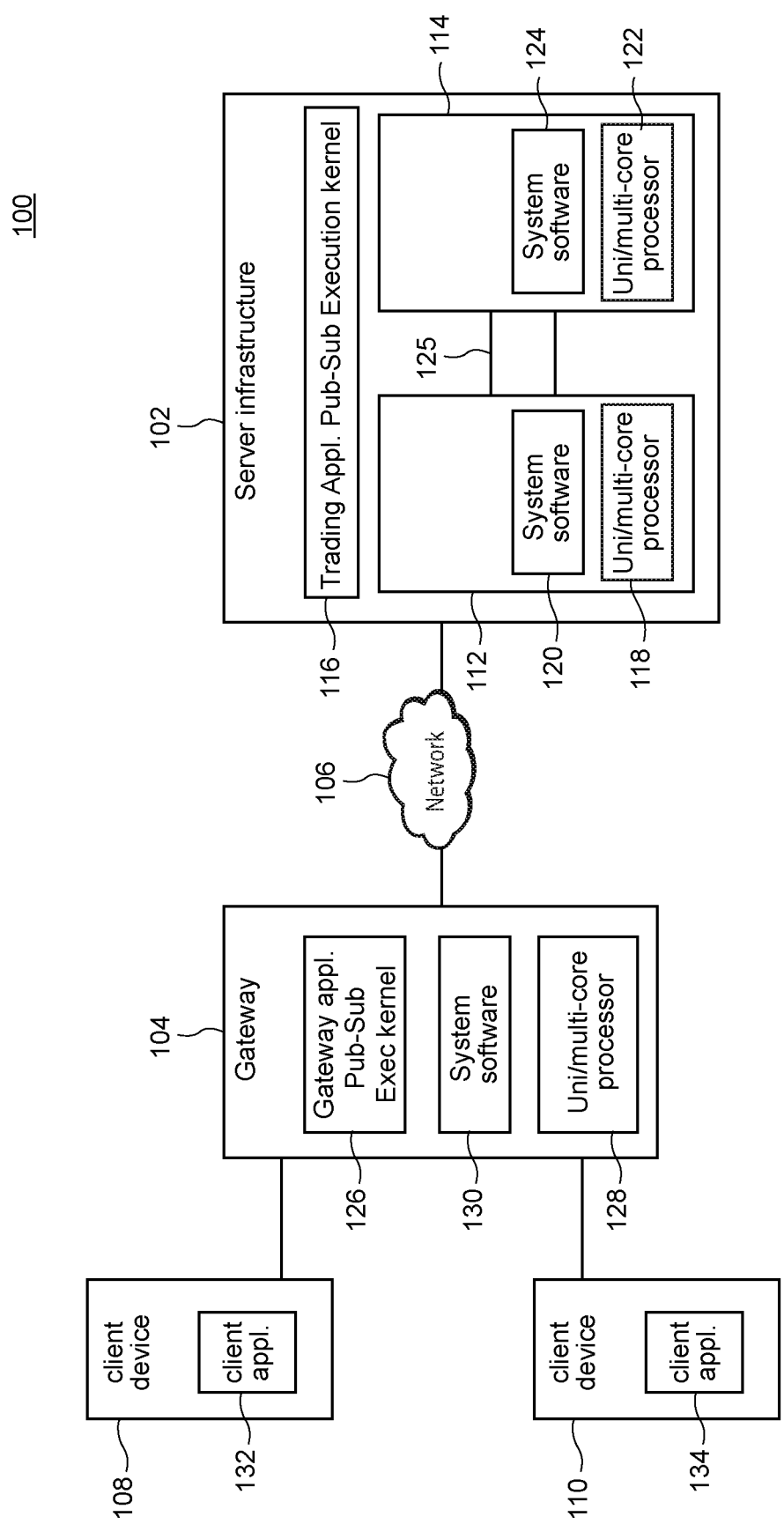
FIG. 1 illustrates an example computing environment in which the publish-subscribe framework is used for asynchronous and simultaneous execution of application components, according to some example embodiments.

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Overview

The technology described herein relates to, among other subjects, a publish-subscribe message framework (sometimes referred to herein as "publish-subscribe framework") in which an application, decomposed to a plurality of processing stages, can be run by executing respective processing stages of the application asynchronously and simultaneously with each other. The asynchronous and simultaneous execution of the processing stages, in many instances, results in shortening the time to completion of the application in comparison to the same application being executed in another type of framework, such as, for example, a purely procedural framework. Communications between the respective processing stages may exclusively be in accordance with the publish-subscribe execution model. The described publish-subscribe framework provides for processing stages to be executed in a multi-process and/or multi-threaded manner while also enabling the distribution of the processing stages to respective processing resources in a multi-processor/multi-core processing environment.

The systems and techniques described here may be particularly well suited for high transaction volume applications in which transaction speed is of high importance, such as, an electronic exchange for trading equities and/or other tradable instruments. Such applications require substantial processing in real-time or in near real-time in response to requests which may simultaneously be received from numerous users. In example embodiments, the processing required in such an application can be characterized as a processing pipeline which can be decomposed into a plurality of pipeline processing stages. The pipeline processing stages, each stage having processing logic for one or more functional areas, can then be executed in an asynchronous and simultaneous manner in relation to each other with a publish-subscribe framework providing for intercommunication between groups of pipeline stages, thereby yielding a substantial speed up of trading activity. It will be understood that the electronic exchange application and the associated gateway application described here are provided as examples, and that embodiments are not limited to electronic exchange and/or gateway applications.

Figure 2:
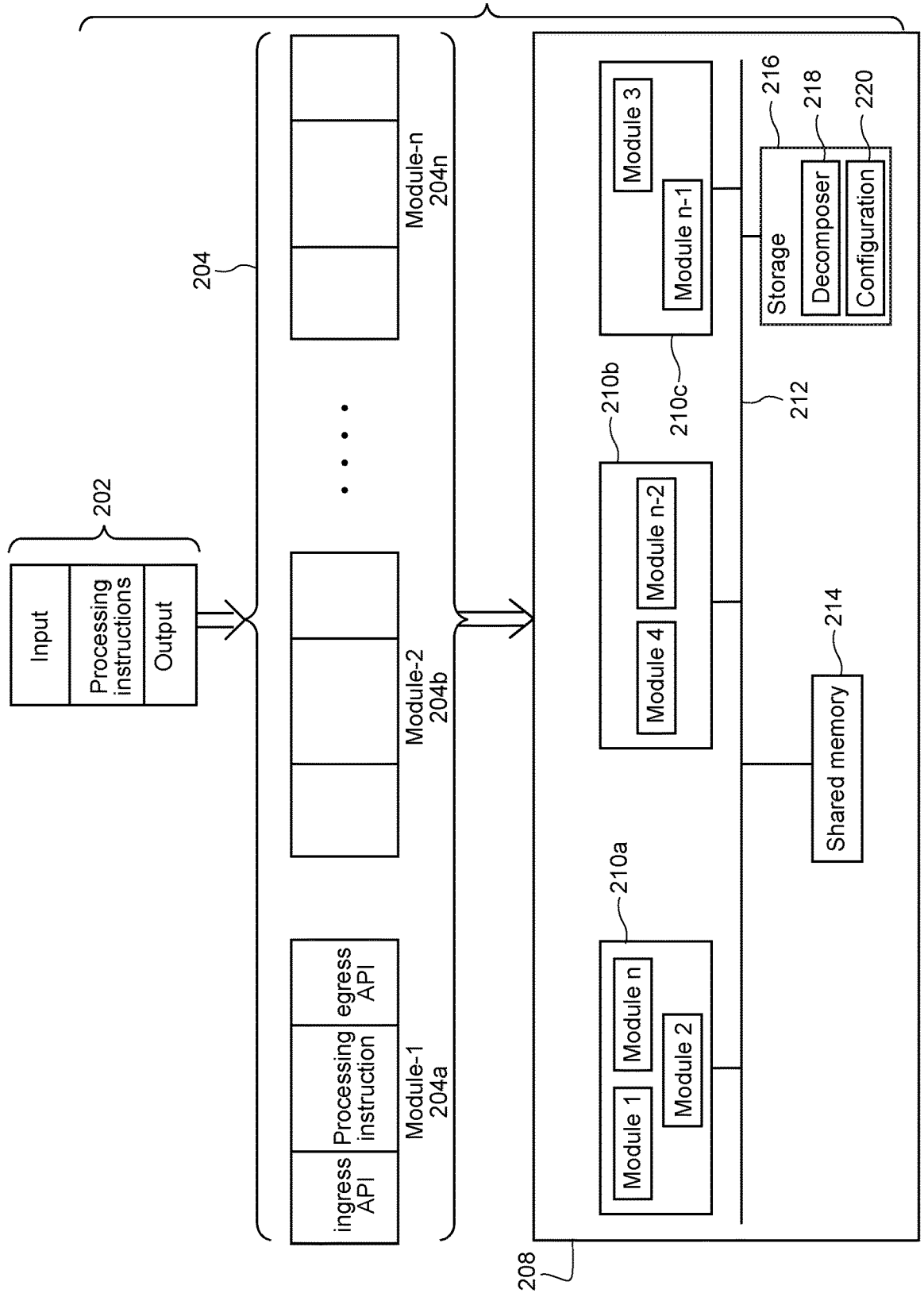
FIG. 2 illustrates a high level view of an application, a decomposition of an application into a plurality of stages for use in an environment such as that shown in FIG. 1, and the stages being deployed in an multicore and/or multiprocessor processing environment, according to some example embodiments.
Figure 3:
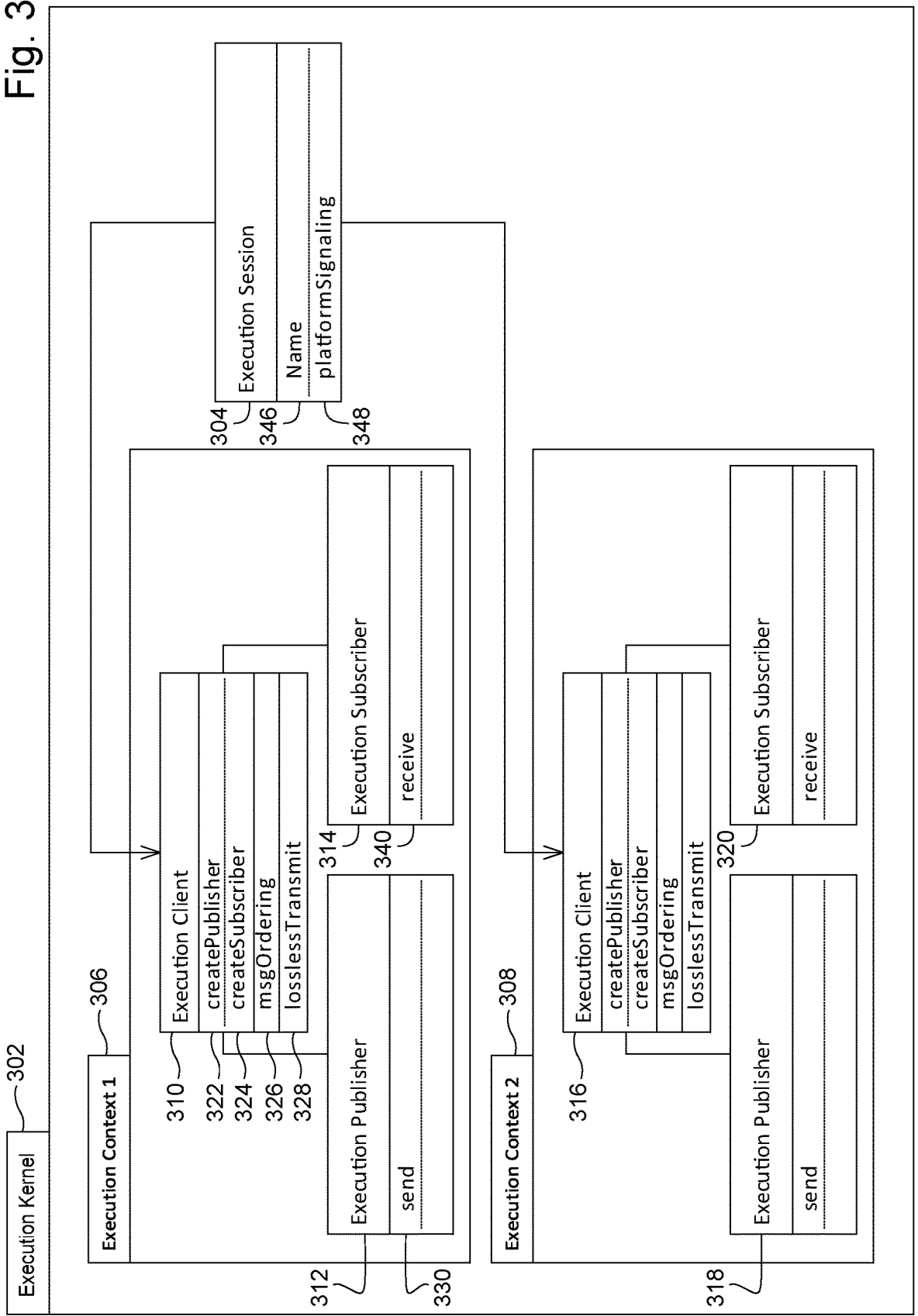
FIG. 3 illustrates a schematic representation of some data structures of objects or entities for executing the stages of an example application and some relationships between the data structures, according to some example embodiments.
Figure 4:
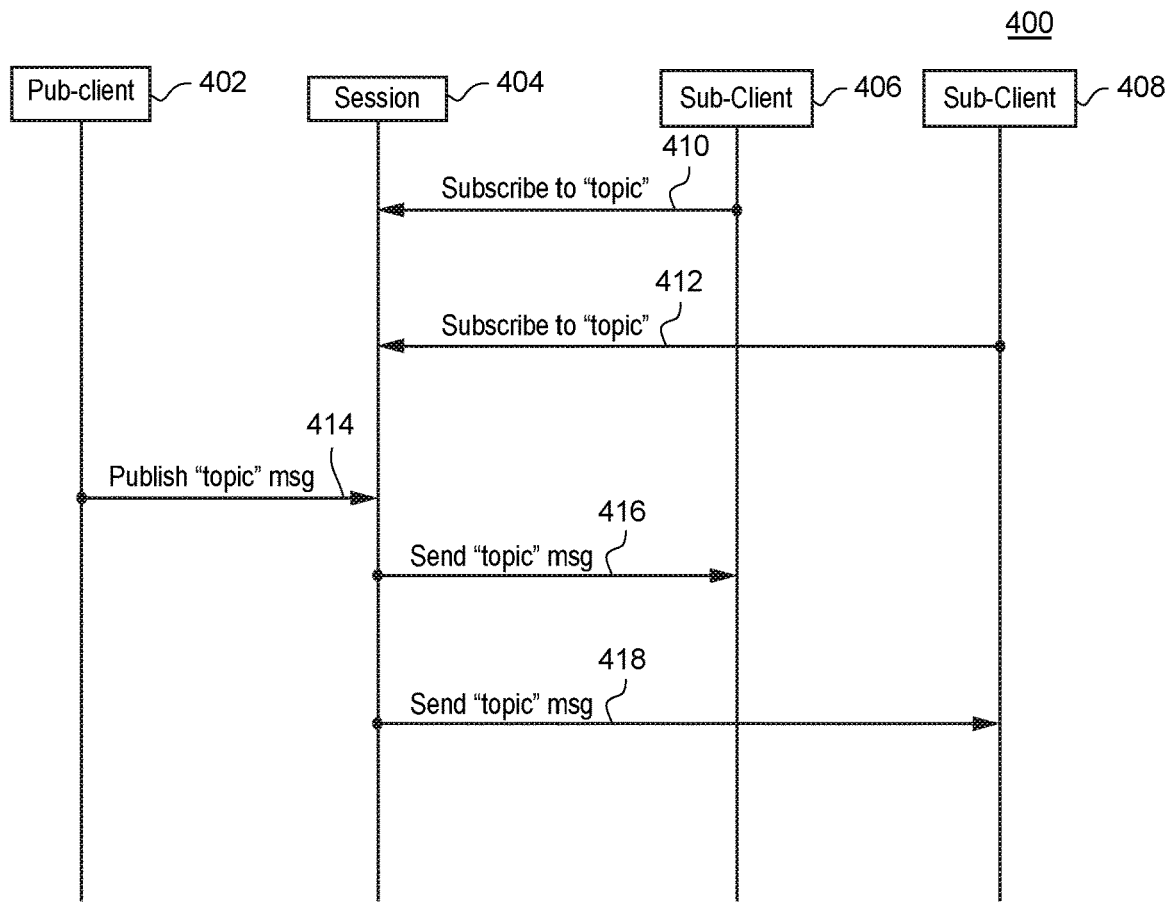
FIG. 4 illustrates an example activity flow representing publishing and subscribing, according to some example embodiments.
Figure 5:
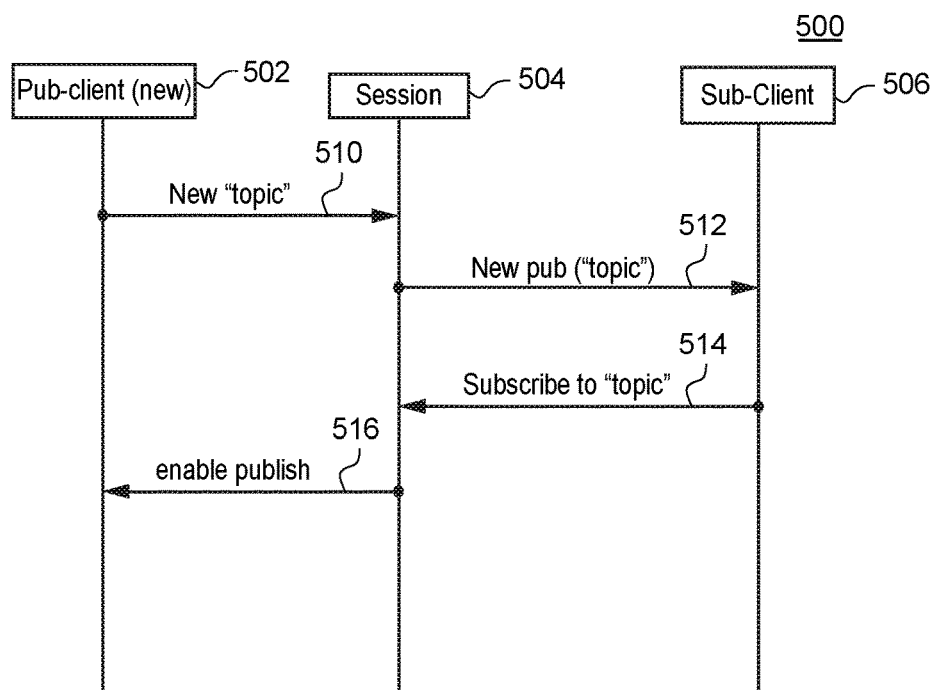
FIG. 5 illustrates an example activity flow representing adding a new publisher, according to some example embodiments.
Figure 6:
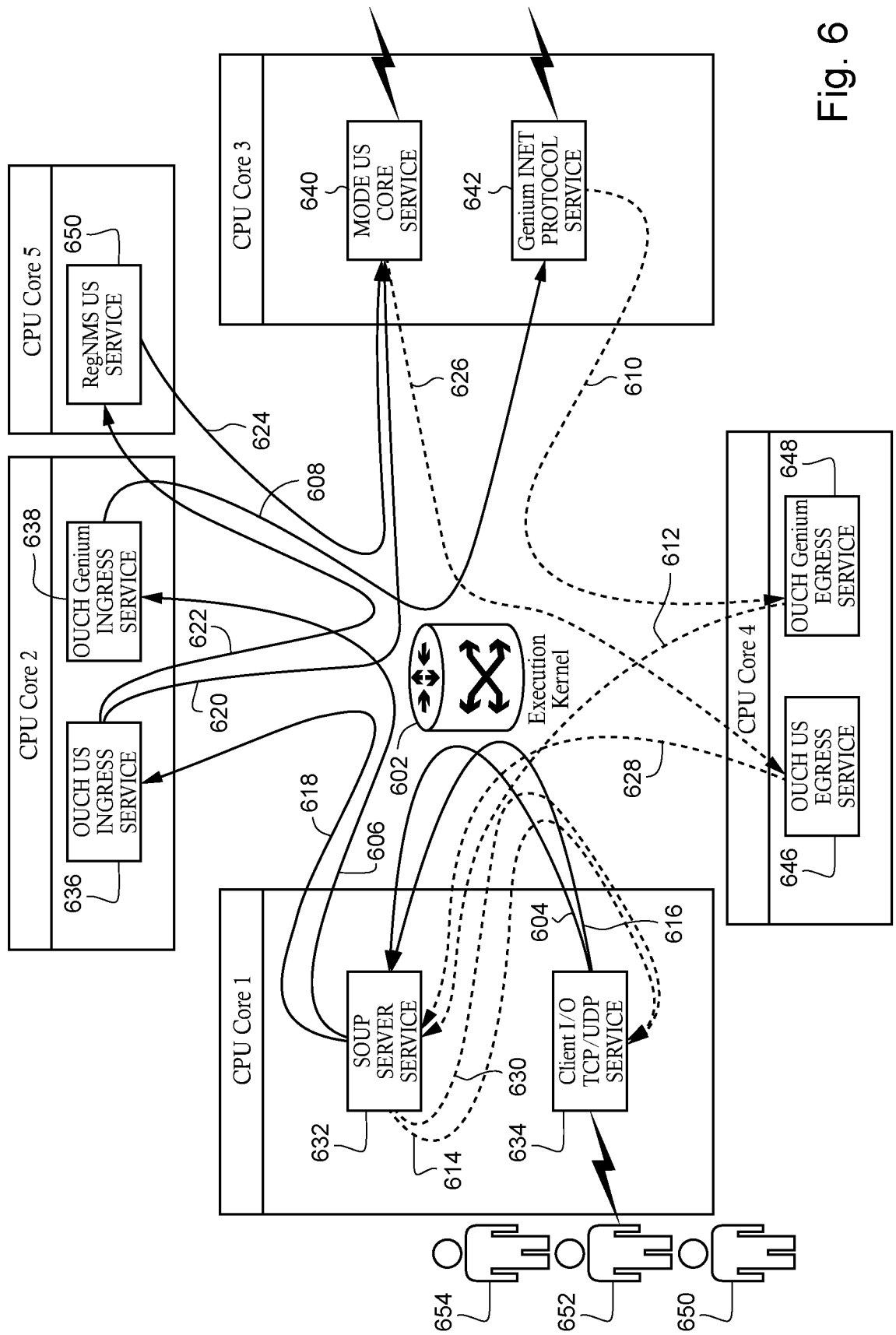
FIG. 6 illustrates an example application, such as the gateway application shown in FIG. 1, being deployed in a publish-subscribe framework according to some example embodiments.
Figure 11:
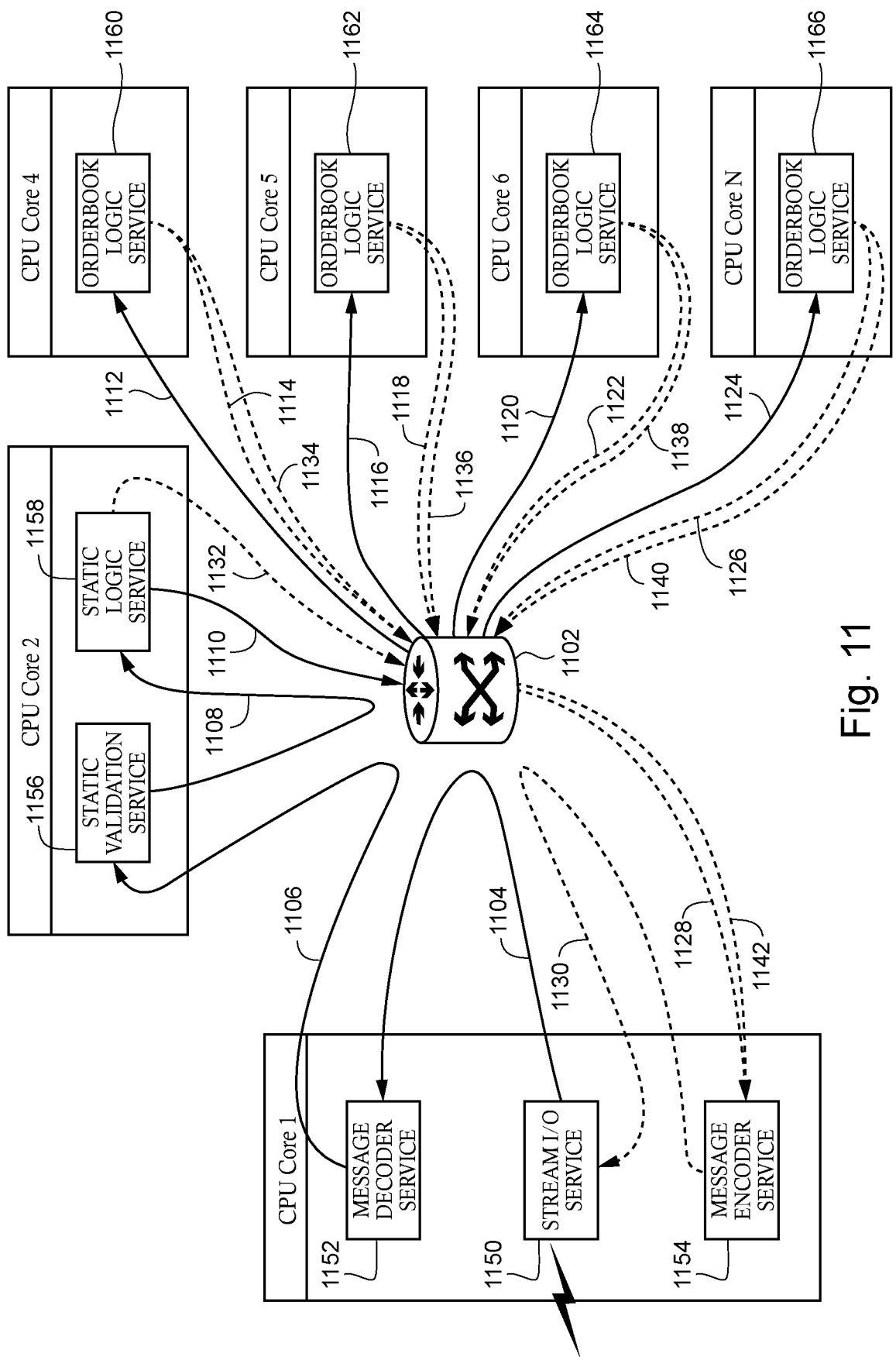
FIG. 11 illustrates an example application, such as an electronic exchange application as shown in FIG. 1, being deployed in a publish-subscribe framework, according to some example embodiments.
Figure 12:
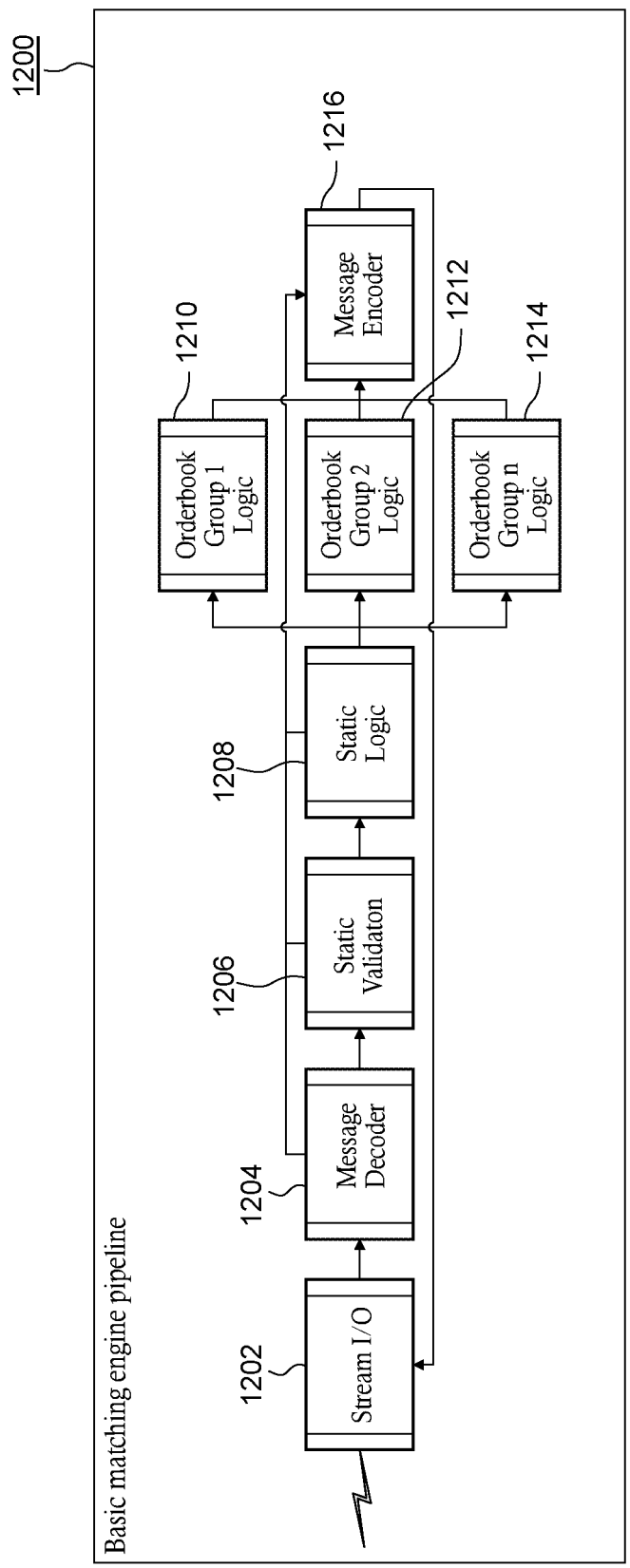
FIG. 12 illustrates an example sequence of operations for a matching engine pipeline in the electronic exchange application of FIG. 11, according to some example embodiments.
Figure 13:
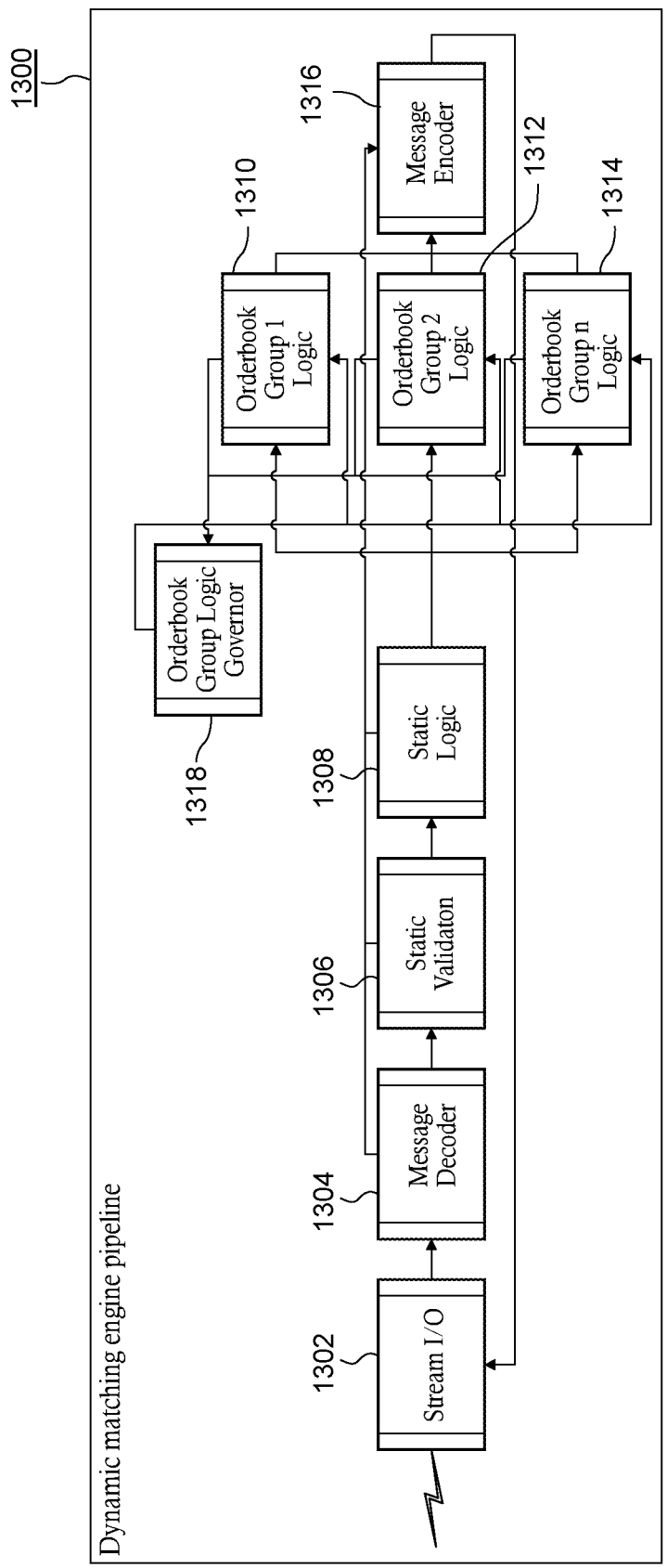
FIG. 13 illustrates an example sequence of operations for a dynamic matching engine pipeline in the electronic exchange application of FIG. 11, according to some example embodiments.
Figure 14:
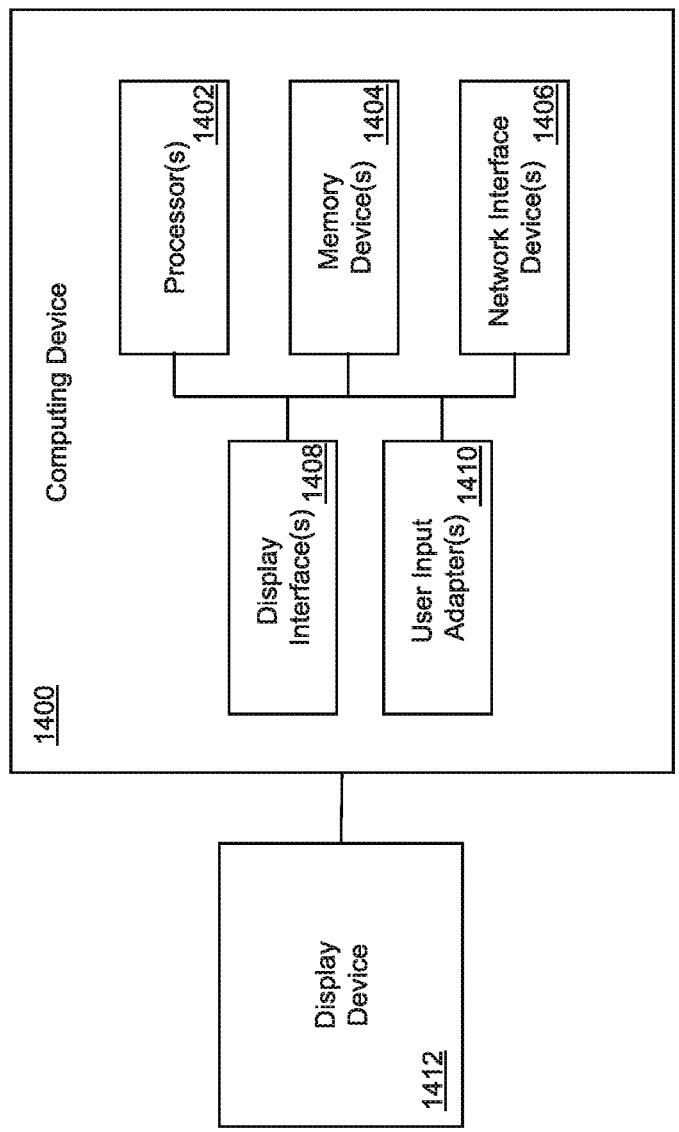
FIG. 14 schematically illustrates a computer that can be used to implement the publish-subscribe framework, according to some example embodiments.

FIG. 1 illustrates a computer environment in an example embodiment in which an electronic exchange application, which is implemented in accordance with a publish-subscribe framework, services client requests, such as, for example, data messages including orders received from users. Users may provide streams of data messages, for example, orders for transacting on an electronic exchange engine, to gateways that may also be implemented in accordance with the publish-subscribe framework of embodiments. The gateways may aggregate and/or preprocess client requests before forwarding the requests to the electronic exchange application (sometimes referred to as "exchange engine"). FIG. 2 schematically illustrates an example decomposition of an application program, such as the electronic exchange application or gateway application of FIG. 1, into a plurality of processing stages each with its own set of ingress/egress message interfaces. FIG. 2 also illustrates an example distribution of the decomposed processing stages into respective processing cores in order to execute the processing stages in a simultaneous and asynchronous manner. FIG. 3 shows some objects, and relationships between the objects, in a publish-subscribe framework that may be used in executing the applications such as those in FIG. 1. FIGS. 4 and 5 illustrate example publish-subscribe message exchanges between publisher, subscriber and the session components in the publish-subscribe framework. FIG. 6 illustrates an example message flow in an example gateway application such as the gateway application shown in FIG. 1. FIGS. 7-10 show various message exchange sequences among the decomposed processing stages of the gateway application of FIG. 6. FIG. 11 illustrates an example message flow in an example electronic exchange application, such as the application of FIG. 1. FIGS. 12-13 show various example message exchange sequences among the decomposed processing stages of the electronic exchange application. FIG. 14 illustrates a computer that can be used for implementing any of the client devices, gateways or servers of FIG. 1.

Description of FIG. 1

FIG. 1 illustrates a computing environment in accordance with certain example embodiments. The non-limiting computing environment 100 includes one or more servers in server infrastructure 102, one or more gateway systems 104 connected to the server infrastructure by a network 106, and client systems, including client devices 108 and 110. The servers in server infrastructure 102 may communicate with gateway system 104 and client devices 108 and 110, so that users on client devices 108 and 110 can interact with an electronic exchange application 116 executing in server infrastructure 102.

The example computing environment 100 provides an electronic exchange for electronic trading of equities, derivatives, or other financial or commodity instruments by executing the electronic exchange application 116 in server infrastructure 102. At least in some embodiments, the electronic exchange application 116 may provide for electronic continuous trading in which the trade of at least some types of tradeable instruments are attempted on an ongoing real-time basis. For example, each data message containing an order (e.g., buy order or sell order) in a stream of incoming client requests from client devices 108 and 110 and/or gateway system 104 is immediately (e.g., in real-time or near real-time without any intervening non-essential processing and/or memory/storage access activity) upon receipt compared against an order book to determine a match. Example embodiments are configured to use data structures and matching techniques, and the like, that can efficiently process tradable instrument records that include a plurality of homogeneous and/or heterogeneous attributes in large volumes (e.g., hundreds or thousands of orders per second; several hundred thousand orders per second) and in real-time time constraints (e.g., process the majority of incoming orders within 1 second; process orders with an average processing time not exceeding a first predetermined number of micro/nano seconds and such that none of the orders exceed a second predetermined number of micro/nano seconds processing time; process all orders of a particular type within a predetermined fraction of a second, etc.). The server infrastructure 102 may also operate to perform other associated tasks such as updating inventory records, and notifying other systems regarding the executed orders so that the delivery etc. can be tracked. One or more of an order book server, an order matching engine (referred to simply as "matching engine"), an order management server, a position management server, and a fulfillment management server may be included, or may interact with, the electronic exchange application 116 to provide the electronic exchange functionality on the server infrastructure 102.

The electronic exchange application 116, or the matching engine (not shown separately) which is a part of the application 116, may operate to match each incoming order with orders from the order book database (also referred to as "standing orders database"). For example, the matching engine may operate to match an incoming buy order with one or more sell orders stored in the order book database, or to match an incoming sell order with one or more buy orders stored in the order book database. The matching may be performed in accordance with one or more predetermined or dynamically determined matching rules from a matching rules database. In some example embodiments, one or more of the servers may provide an interface (e.g., an application programming interface—API) which can be used by other servers in server infrastructure 102 and/or external computers to interact with it. For example, one or both of the order matching engine and order book server, which are used in the real-time order matching process, may communicate with each of the other servers in server infrastructure 102 and/or external computers via APIs.

The capability of the server infrastructure 102 to process incoming orders at high speeds (e.g., several thousand or several hundred thousand matches a second) so that the matching process can be relied upon to strictly honor the time ordering in which the respective orders are received and to process orders in a minimum time interval after the order has been transmitted by the user, is very important and may underpin the accuracy and validity of trades made on the system.

Server infrastructure 102 may include one or more physical server computers (e.g., computers 112 and 114) that are communicatively connected to each other over a network and/or point-to-point connections. The physical server computers may be geographically co-located or distributed. The interconnection between servers in server infrastructure 102 may be via the Internet or over some other network such as a local area network, a wide area network or point-to-point connections (e.g., connection 125) with each other. In some embodiments, multiple servers are interconnected with high speed point-to-point connections and/or a high speed broadcast bus.

Each of the computers 112 and 114 includes a processing system having at least one uni- or multi-core processor (e.g., processors 118 and 122) and includes system software (e.g., system software 120 and 124). In some embodiments, computers 112 and 114 may be respective processing units in a Symmetric Multiprocessor (SMP). In some embodiments, computers 112 and 114 may be standalone computers interconnected with a high speed connection.

The system software 120 may include the operating system for computer 112, and may provide system calls etc., by which applications such as application 116 can request services from the operating system to control the processor (s) 118 and/or peripheral devices. System software 120 may also provide for inter-process communication between processes and/or threads executing on the same or different processors/processor cores, and may also provide for communication between separate computers over one or more network interfaces. Thus, system software 120 provides for the execution kernel (e.g., the execution kernel executing the application 116) to access system resources (e.g., processors, processor cores, memory, storage, communication interfaces etc.) in order to perform intra-process, inter-process, inter-thread, and/or inter-host communication as necessary. System software 124 may be similar to system software 120, and may also have the above described capabilities of system software 120.

According to embodiments, the application 116 comprises, or operates as, a publish-subscribe execution kernel based on a publish-subscribe message exchange framework. The application 116 may use system software 120 (and/or 124) to access or control system resources such as the memories (not separately shown in FIG. 1) and processors 118 and 122, so that individual components of the application 116 can be located on particular processing resources in a manner that provides for optimal (or improved) concurrency, speed, and/or reliability.

The execution kernel (sometimes simply "kernel") forms the basis for pipelined data driven application architectures in accordance with embodiments. The execution kernel is intended for a similar paradigm such as approaches in event/message driven systems where applications are designed to have a "main loop" with an associated queue of "events" which are typically processed in the order they are enqueued, but with multiple threads processing different application stages asynchronously and simultaneously. To enable this, a message-based paradigm is employed by the execution kernel to enable the passing of execution and messaging between threads, processes and hosts. The communication paths between the different processing stages are expressed as publishing and subscribing to "topics" which may be chosen by the application designer or a decomposing program logic. At least in some embodiments, all the communication between two or more processing stages is expressed as publishing and subscribing to topics. That is, in certain example embodiments, the only way in which information is exchanged from one processing stage to another is through the publish-subscribe framework, and there are no side channels through which such information can be obtained.

The messaging topology in the execution kernel of example embodiments is logically a broadcast architecture where multiple subscribers can subscribe to the same message. This enables a logical bus-like architecture where messages can fork to multiple endpoints or to a single endpoint as needed. Since the topology is expressed as publishing and subscribing endpoints, an application may be required only to indirectly express the desired communication paths, and the subscribing endpoint has no direct knowledge about the publishing endpoint.

Publishers and subscribers in the framework may have imposed upon them, both a partial ordering requirement and a lossless communication requirement. That is, at least in some embodiments, the order in which messages are published by a publisher is the order they must be received at a subscriber. This is needed to enable deterministic processing of messages at subscribing endpoints.

To enable dynamic creation of messaging topologies, certain guarantees are required. Therefore, creation of session, publishers, etc., may cause generation of signals within the execution kernel. That is, when a new publisher is created, all subscribers participating in the same session will receive a notification that a new topic exists (e.g., each publisher is associated with a topic) and can, in response to the notification, subscribe to that topic as per the particular subscriber's requirements. In some embodiments, the publisher is enabled to publish messages for a topic only after at least one subscriber has subscribed to that topic.

The approach in certain example embodiments to use publish-subscribe messaging, including the use of such messaging within a single process, is enabled in some embodiments by exploiting lock-free data passing in SMP-based systems which allows utilizing the memory subsystem of the hardware to be used as a highly efficient point-to-point transport. Point-to-point communication with appropriate lock free queues, communicating messages from one CPU core to another can be done with a few pipelined CPU instructions when passing a pointer to a block of memory. This can then be extended to represent a broadcast bus, for example, by pushing the same pointer to multiple CPU core queues. The recipient CPU cores read the pointer and access the memory block that the originating CPU sent.

With this fundamental mode of communication, the publish-subscribe messaging can be expressed in a highly efficient manner for in-process communication and also for host-local communication using shared memory mapping. The fact that the publish-subscribe framework is implemented as a set of managed intra-CPU core queues with exchanges of memory blocks is hidden to the application logic. Additionally the management of the memory blocks are transparent to the application using publish subscribe.

The application, by the act of creating both publishing and subscribing endpoints (i.e., publishers and subscribers), indirectly expresses the required connectivity to the framework and underlying infrastructure. The communication infrastructure then creates the required intra thread queues that form the physical communication paths. The result on the low level transport level is a connected mesh where all subscribing and publishing endpoints are connected.

Signaling using additional queues and a controlling execution kernel may be used to enable dynamic creation of communication domains such as, for example, process, host or network communication domains. The signaling and ordering guarantees of message publishing is required in certain embodiments to enable deterministic creation and bring up of new communication sessions which can be used to model data flows.

The gateway 104 may be located either geographically remotely from the server infrastructure 102, or locally with the server infrastructure 102. The gateway 104 may include at least one uni- or multi-core processor 128 and system software 130. The processor 128 and system software 130 may be, at least in some embodiments, similar to processor 118 and system software 120, respectively, described in relation to computer 112. The gateway 104 may run a gateway application 126 that operates to aggregate and/or preliminarily process client requests before they are transmitted to the server infrastructure 102. Aggregation may include bundling two or more user initiated orders in one message to the server infrastructure. Preprocessing may include changing headers, authentication, and/or encryption. According to some embodiments, the gateway application 126 is implemented as a publish-subscribe execution kernel.

Any of the above mentioned applications may interact with an enterprise service application (not separately shown) for managing user authentication, with clients 108 and 110 for receiving incoming orders from and for transmitting order/trade confirmations, and database management systems and/or external servers for obtaining information to be used in the processing or to report information regarding orders, trades and positions, as well as market statistics. An application, such as any application on server 102, may comprise one or more client-side components and one or more server-side components. Client-side components of an application may operate to provide for handling the user interface by performing presenting (e.g., displaying) of information on a user interface device; receiving user input, etc. Server-side components may provide for authentication, service metering, generating or obtaining information to be presented to the user in accordance with received user inputs.

Example client devices 108 and 110 can be configured to execute the same or different client applications 132 and 134, respectively. The client device applications may include a client-side portion of an electronic exchange application. In the illustrated example of FIG. 1, client device 108 is executing a trading application (e.g., client application 132 is a client-side trading application for interfacing with an electronic exchange) and transmits a buy order through that trading application. Client device 110 may execute the same or different trading application, and may transmit a sell order to server 102. Client devices 108 and 110 may include any of personal computers, mobile computers, tablets, smartphones, and other electronic devices. In some example embodiments, any electronic computing device including at least a display, an input device for user input, and a communication interface for communicating with the server device may operate as a client device. Although two client systems are shown, any number of client systems may interact with server infrastructure 102. Client requests may be generated by human user interaction and/or a computer program.

It should be understood that the software modules shown in FIG. 1 are stored in and executed by hardware components (such as processors and memories), and it should be further understood that, whenever it is described in this document that a software module performs any action, that is done solely for ease of description, and the action is in actuality performed by the underlying hardware according to the instructions and data that comprise the software module. Further details regarding example hardware components that may be used to implement the features described herein are provided below with reference to FIG. 14, as well as in other places in this document.

In many places in this document, including but not limited to in the above description of FIG. 1, software modules and actions performed by software modules are described. This is done for ease of description; it should be understood that, whenever it is described in this document that a software module performs any action, the action is in actuality performed by underlying hardware elements (such as a processor and a memory device) according to the instructions that comprise the software module. Further details regarding this are provided below in, among other places, the description of FIG. 14.

Description of FIG. 2

FIG. 2 illustrates a high level flow illustrating program code for an application, a decomposition of the application program code into a plurality of processing stages for use in a processing environment such as that shown in FIG. 1, and the processing stages being deployed in a multicore and/or multiprocessor processing environment, according to some embodiments.

The use of the execution kernel framework for a particular application includes first finding the set of separable processing stages that can be executed asynchronously and simultaneously. This can be performed on a functional basis where each function is a potential candidate, but to achieve higher efficiencies the decomposition may be oriented around functional areas. A functional area can be things such as static validation against reference data, logic processing, output generation, etc. An example guiding principle for decomposing an application to a plurality of processing stages may be that functionality that can be reused or that isn't overlapping others should preferably be separated into its own processing stage.

When a number of processing stages are identified to be decomposed, the message API of each of those stages may be defined, both ingress and egress. The names of the messages can then be used as topics when creating publishers and subscribers in the individual components obtained by decomposition. This approach creates isolated and self-declared components and can be thought of as taking classic vertical procedural calls and converting them to messages which form a horizontal pipeline.

In an example embodiment, a program code 202 for an application such as, for example, a gateway application 126 or an electronic exchange application 116 shown in FIG. 1, may be decomposed into a plurality of components or modules 204 (e.g., module-1 204a, module-2 204b, module-n 204n). The program code 202 may be specified using one or more programming languages or scripting languages from a set, and may specify one or more inputs, processing logic instructions, and one or more outputs. The processing logic instructions in program code 202 may be specified as a sequence of instructions including at least some instructions having procedure calls. The decomposition, at least according to some embodiments, takes as input a program code such as program code 202 that is specified entirely declaratively, and outputs a set of processing stages that interact with each other entirely within the publish-subscribe paradigm by exchanging messages.

The decomposition of program code 202 may be performed automatically, manually, or by a combination thereof. For any portions of the decomposition performed automatically (for example, by a decomposition program 218), the decomposition process may be controlled in accordance with one or more user-configurable configuration parameters 220. A partial decomposition, for example, may be based upon a high level domain-specific language (DSL) where more of a meta-level description of processing is described. This may then be an input to a compiler for this DSL which can then generate the resulting composition of publish-subscribe modules. The compiler may make decisions based on a complexity description of each function and choose to create a procedural call in cases when the function is simple and a publish-subscribe link when complexity is high. It may also base decisions upon the required topology when the output of one function is used as input into multiple other functions so as to exploit asynchronous processing.

According to some embodiments, decomposition includes identifying a separate functionality (e.g., a module used by several parts of a program code, etc.) in the program code 202, extracting all (or substantially all) instances of that identified separate functionality from the program code 202, and defining a message interface between the extracted portion and the rest of the program code 202. The various functionalities in the code 202 may be grouped in accordance with such characteristics as function/class names, class attribute names, calls made from within functions/classes etc.

User configurable configuration parameters that can control the automatic decomposition process may include one or more identifiers of modules (e.g., names of functions, procedures or classes) to be extracted, maximum number of decomposed modules allowed, number of processors to which modules can be distributed, number of processor cores to which modules can be distributed, etc.

The modules 204 are then distributed to a plurality of processors and/or processing cores so that one or more performance characteristics and/or performance metrics are improved. In the example embodiment illustrated in FIG. 2, the modules 204 are distributed among the processing cores 210 (210a, 210b and 210c) of a computer 208. In some embodiments, the distribution may include distributing a substantially equal number of the modules (or in a manner that attempts to achieve a substantially even distribution of the workload) to each processor or processing core. In distributing the modules, two or more modules may be located on a particular processing core when they have some likelihood of sharing data and/or frequent interactions. The thresholds for a level of shared data or for a level of frequent interactions (e.g., based on matches between egress/ingress APIs of the two modules, expected number/frequency of messages) that qualify modules to be collocated may be configurable.

In the illustrated embodiment, computer 208 may be a SMP computer with each core having its own local memory, and all cores 210a-210c connected to a communication bus complex (communication infrastructure) 212 having access to a shared memory 214, and optionally, a storage 216. Modules 204 located on respective cores may communicate with each other via the shared memory 214 and/or message exchange via bus complex 212. Modules 204 located on a same core may also interact via that core's local memory (or local cache). For example, as described above, lock-free queues in shared memory (e.g., in shared memory 214 for exchanging information between processing stages on different cores and/or in a core's local memory for exchanging information between processing stages or related threads executing on the same core) may be used information between respective processing stages. In the illustrated embodiment, decomposed modules 1-n are distributed to the processing cores of computer 208 such that, module 1, 2 and n are located in core 210a, modules 4 and n−2 are located in core 210b and modules 3 and n−1 are located in core 210c. Storage 216 may have stored thereon decomposer 218, the logic for decomposing program code 202, and also configuration parameters 220.

Description of FIG. 3

FIG. 3 illustrates a schematic representation of objects corresponding to certain primitives for implementing the publish-subscribe framework according to some example embodiments, and the relationship between the objects in an execution kernel executing an application in accordance with the publish-subscribe framework.

FIG. 3 depicts the hierarchical relationships of objects in the execution kernel according to certain embodiments. The "kernel" or "kernel object" 302 is the central piece that has knowledge about all other primitives and is the root for creating other primitives. The execution kernel object 302 may instantiate a publish-subscribe framework which facilitates construction of multi-threaded, multi-core, multi-process and multi-host applications. The execution kernel facilitates the implementation of synchronization for multi-processing applications.

The session object 304 describes streams of messages and provides for the application to control grouping of related messages. The session object provides for instantiation of the pipeline of processing stages (e.g., a functional area based pipeline of processing stages, as described above) for a particular application. As publishers and subscribers are tied to a particular session, creating a new session and creating the same set of publishers and subscribers on the new session will result in a new instance of the same pipeline with a message flow isolated from the other instances. There can be different implementations of the session objects for the different domains of the message transports, for example, process domain, host domain, and network domain. Whereas the description of FIG. 2 is in terms of a plurality of processing cores within a same process communication domain that is facilitated by a user session in the process domain, the capability to instantiate the user channel in the host domain and network domain enables distribution of pipeline processing stages to multiple processors and over a network to multiple hosts. In the case of the host local domain, the same or similar shared memory model can be used to formulate the messaging primitives which uses the host memory subsystem to enable communication between different processes on the same host. The main difference may be that the orchestration and signaling of the execution kernel may require to be implemented as an out of process daemon to facilitate this interaction between multiple processes. In the network domain, in some embodiments, an implementation similar to that described in U.S. Pat. No. 9,712,606 (the contents of which is hereby incorporated in its entirety) where a reliable ordered stream is utilized for each session may be used. The session object may be identified by a name attribute 346. The session object may include a method 348 for signaling session participants to inform of events such as new publishers and/or new subscribers joining the session.

The context objects (e.g., execution contexts 306 and 308) provide for the application to control reception and transmission of messages, and by extension, the execution of the application. The context objects 306 and 308 describe threads of execution. Each context object is also a multi-plexor object (selector) with which readable and writeable status can be monitored for individual objects. As each client is bound to a particular context and the publishing and subscription is bound to a particular client, the reception and transmission of messages for a client are within an application-defined context. As each context may map to a respective thread of execution, the application can choose which context to use for a particular client and hence control the threading of the processing stages without the need for the individual processing stages to have specific knowledge on which thread it is executed and how to communicate with other components.

The "client" or the "client object", such as for example either of client objects 310 and 316, describe the participation in a session. The client is used both for publishing and subscribing to messages. Each client object may instantiate a publisher object and a subscriber object. Methods such as createPublisher 322 and createSubscriber 324 may be used for the creation of a publisher and subscriber, respectively. The order of messages are preserved for each client, meaning that one or more subscribing clients will receive the messages in the same order as they were published by the corresponding publishing client. The order for two different publishing clients, however, may be undefined. The message ordering may be handled using a method such as msgOrdering 326. The ordering may be handled by enqueing published messages and distributing the messages to each subscriber only according to the order in the queue of published messages. Lossless transmission of messages may be handled for the client by a method such as losslessTransmit 328. Lossless transmission may be performed by implementing an acknowledgement and/or retry mechanism associated with each published message.

The "publisher" or the "publisher object", such as, for example, publisher objects 312 and 318, describes the type of the message being sent. That is, a publisher is created with a name which then is the "topic" of that particular publisher. Whenever a message is sent (e.g., using send method 330) with the publisher, it is sent as that particular topic.

The "subscriber" or the "subscriber object", such as, for example, either of subscriber objects 314 and 320, describe the type of message being received. That is, a subscriber is created with a name which is the "topic" of that particular subscriber. Whenever a message is being received (e.g., using receive method 340) for the subscriber, it is of that particular topic.

According to an embodiment, the electronic exchange application execution kernel 116 may be an instantiation of the kernel object 302, and may corresponding to a process. A session object 304 may be instantiated as a thread to coordinate the publish-subscribe framework. In an example embodiment, a session object may be instantiated for each order request received from a user. Each of the decomposed processing stages of application 116 may be a separate instantiation of a client object (e.g., such as client objects 310 or 316), and may correspond to a respective thread that executes asynchronously and simultaneously with other threads of the process corresponding to electronic exchange application 116. Each client object instantiates its ingress message API by instantiating a corresponding subscriber object (e.g., subscriber object 314 of client object 310), and instantiates its egress message API by instantiating a corresponding publisher object (e.g., publisher object 312 of client object 310). As described above, each publisher and subscriber is associated with at least one topic identifying the particular message(s) to be published or subscribed. The publishing and subscription to particular topics define the logical topology for communication between the processing stages. In certain embodiments, the execution kernel determines an arrangement of the processing stages on available processing resources and sets up a logical communication infrastructure to efficiently facilitate communication between the different processing stages. The distribution and the logical communication infrastructure may be configured to improve a predetermined performance metric (e.g., application speed, such as average time to process an order, or concurrent volume, such as number of concurrent orders capable of being processed within predetermined time constraints). In accordance with the determined distribution and logical communication infrastructure, the kernel may request the system software (e.g., system software 120 or 124) to run particular threads on identified processing resources and to create one or more message queues in shared memory.

Description of FIG. 4

FIG. 4 illustrates an example activity flow 400 representing publishing and subscribing in an execution kernel, according to some example embodiments.

As shown in the activity flow 400 between the session thread 404, publisher thread 402, and subscriber threads 406 and 408, subscribers that desire to receive messages of a particular "topic" subscribe to that "topic". The subscribers (or corresponding subscriber-client objects) 406 and 408 register their respective subscriptions by sending subscription messages 410 and 412 specifying the "topic" to the session object 404.

A publisher-client 402 publishes a message in the "topic", by transmitting a message 414 to the session object 404. The published message is then provided to the subscribing clients by messages 416 and 418 by the session object 404.

Description of FIG. 5

FIG. 5 illustrates an example activity flow 500 representing the adding of a new publisher to a session, according to some example embodiments.

A new publisher is added by a publisher or corresponding client object 502 transmitting a message 508 informing the session object 504 that a new publisher with "topic" has joined the session. The session object 504, then informs each of its clients of the new "topic" as being available for subscription. The session object 504 may transmit respective messages 510 to each of its clients 506 informing them of the "topic".

One or more of the clients may then instantiate a subscriber and notify that it subscribes to the "topic" by transmitting a message 512 to the session object. The session object then notifies, by a message 516, the publisher that it is enabled to publish to the "topic". Subsequent to the "topic" being subscribed to by at least one client, the publisher may then publish to the "topic" as shown in FIG. 4.

More specifically, the subscription is created in the context of a client. The client represents the attachment to the session. When the subscription is created, the client sends a message to the session object to inform the interest in the topic. The session will then send a message to the publishing client implementation that a recipient endpoint is interested in the messages that will be published. When the client (or more accurately—the application logic) has created the necessary subscriptions it will send an acknowledge to the session that it has done all of the required subscriptions (and publisher creations, etc.). When all clients that participates in the particular session has acknowledged the topic (publisher) creation, the client is enabled to publish messages for the particular topic—e.g. 516 will be received from the session object. In summary, creation of a publisher on a client may trigger 510 which in turn triggers one or more of 512 which may lead to a number of 514 depending on the application requirements and all 512 may require to be acknowledged (e.g., through messages (not shown in fig) to the session object) and when all messages 512 have been acknowledged, the message 516 will be sent.

As described in relation to FIG. 4, the publisher (and/or corresponding client), session and subscriber (and/or corresponding client) may be implemented as respective threads.

Description of FIG. 6

FIG. 6 illustrates an example application, such as, for example, the gateway application 126 shown in FIG. 1, being implemented in a publish-subscribe framework, according to some example embodiments.

The gateway application 116 (e.g., Nasdaq's OUCH Gateway™) may be decomposed into several pipeline processing stages to be executed in the execution kernel 602. An example decomposition may result in processing stages including respective processing stages for functional areas such as client connection, client message framing, inbound message logic, outbound message logic, backend message framing, backend connection, user authentication and authorization. FIG. 6 illustrates an example arrangement of the respective processing stages in different processing cores.

Each of the processing stages resulting from the decomposition may be instantiated as a respective client object such as the objects 310 (or object 316). Each client may have its own context (e.g., either execution context object 306 or 308), and may be instantiated as a separate thread within the execution kernel (e.g., object 302).

Thus, the client I/O TCP/UDP service 634, SOUP™ server service 632, OUCH™ ingress service 636, OUCH™ Genium ingress service 638, mode US core service 640, Genium Inet™ protocol service 642, OUCH™ egress service 646, OUCH™ Genium™ egress service 648, and RegNMS US service 650 are each instantiated as a respective client object within its own context.

The message exchanges involved in the processing pipeline for each of the users 650, 652 and 654 can be represented by a sequence of publish-subscribe exchanges between the processing stages. A separate session is created for each user 650, 652 and 654, and each user's session ties together the different pipeline processing stages for that user in a publish-subscribe sequence. The publish-subscribe sequence for user 650 may be represented by message exchanges 604-606-608 (ingress) and 610-612-614 (egress); for user 652, by 616-618-620 (ingress) and 626-628-630 (egress); and for user 654, by 616-618-622-624 (ingress) and 626-628-630 (egress).

Whereas all other processing stages shown in FIG. 6 are associated with the user sessions, stages 640 and 642 are also, in addition, subscribed to a session representing a connection to the backend trade server. Thus, stages 640 and 642 would instantiate a client for the user session and a client for the backend session, with subscriber and publisher on each client. The stages 640 and 642 then perform routing between the user session and the backend session.

An important aspect in relation to gateway application 126 is that the gateway typically already has users connected (and thus sessions established) when a new user establishes a connection. This may pose a challenging synchronization issue as all processing stages in the processing pipeline may be required to be able to accept and process messages associated with the new user and also be able to distinguish the new user from other users.

Thus, the setup of the new user connection may be accomplished by using an execution kernel announcement (signaling) mechanism which allows the distributed pipeline to discover and register the appropriate subscriptions. The announcement mechanism may be used at multiple levels to establish the user specific pipeline.

Upon receiving a request from a user, such as a data message including an order, the client I/O service 634 creates a new execution kernel session for the user. This results in an announcement to all execution kernel contexts which then can open clients on the newly created session. The client I/O service 634 may then create a new execution client on the new execution kernel session, and also creates a new execution kernel publisher for the execution kernel client. This results in an announcement to all execution kernel clients registered on the execution kernel session. Each of the services in the pipeline uses the knowledge about the newly created publisher to create matching execution kernel subscribers to listen for published messages.

When all execution kernel clients have acknowledged the creation of the publisher, the publisher in client I/O 634 can be used to publish messages.

Figure 7:
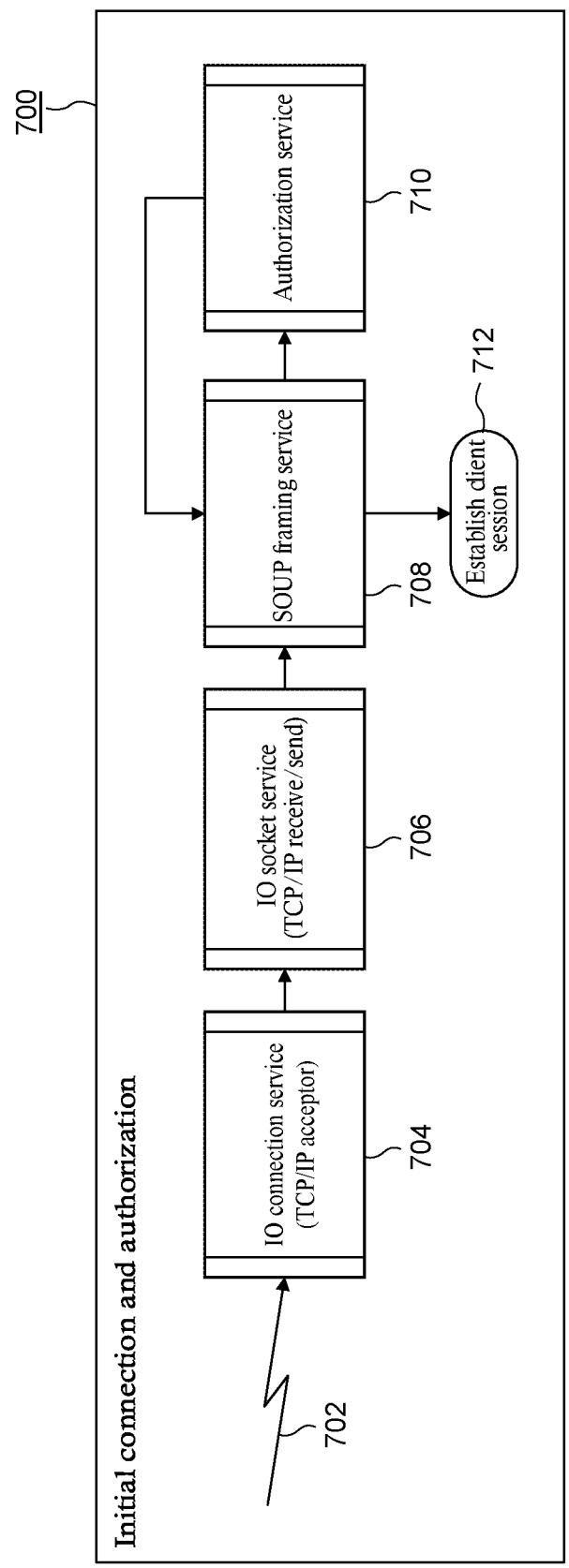
FIG. 7 illustrates an example sequence of operations for initial connection and authorization of a session, according to some example embodiments.

Description of FIG. 7

FIG. 7 illustrates an example sequence 700 of operations for initial connection and authorization of a session, according to some example embodiments. The operations for the initial creation of a user session are shown as a sequence of publish-subscribe message exchanges between pipeline processing stages.

When a gateway (e.g., gateway 104) starts up several new sessions may be started. A control session is created, to which all processing stages subscribe. When a user (e.g., any one of users 650, 652 or 654, for example) initiates a connection by, for example, submitting 702 an order to the gateway, the client I/O service 634 may initially receive the request. The pipeline processing stage 634 may include respective threads for I/O connection service 704 and I/O socket service 706. The I/O connection service 704 receives the connection requests and signals about the new user request on the control session. The I/O socket service then performs handshake with the user and initiates the creation of the new session for the user. After the request is processed by the I/O services 704-706, the request is processed by the SOUP framing service 708 by creating a subscriber for the new session. The framing service 708, may submit the request to be authenticated in the authentication processing stage 710. If the authorization is successful in the authorization pipeline stage 710, the framing service 708 is notified, and the user session is created in an operation 712 and the corresponding session announcement in the execution kernel proceeds.

Figure 8:
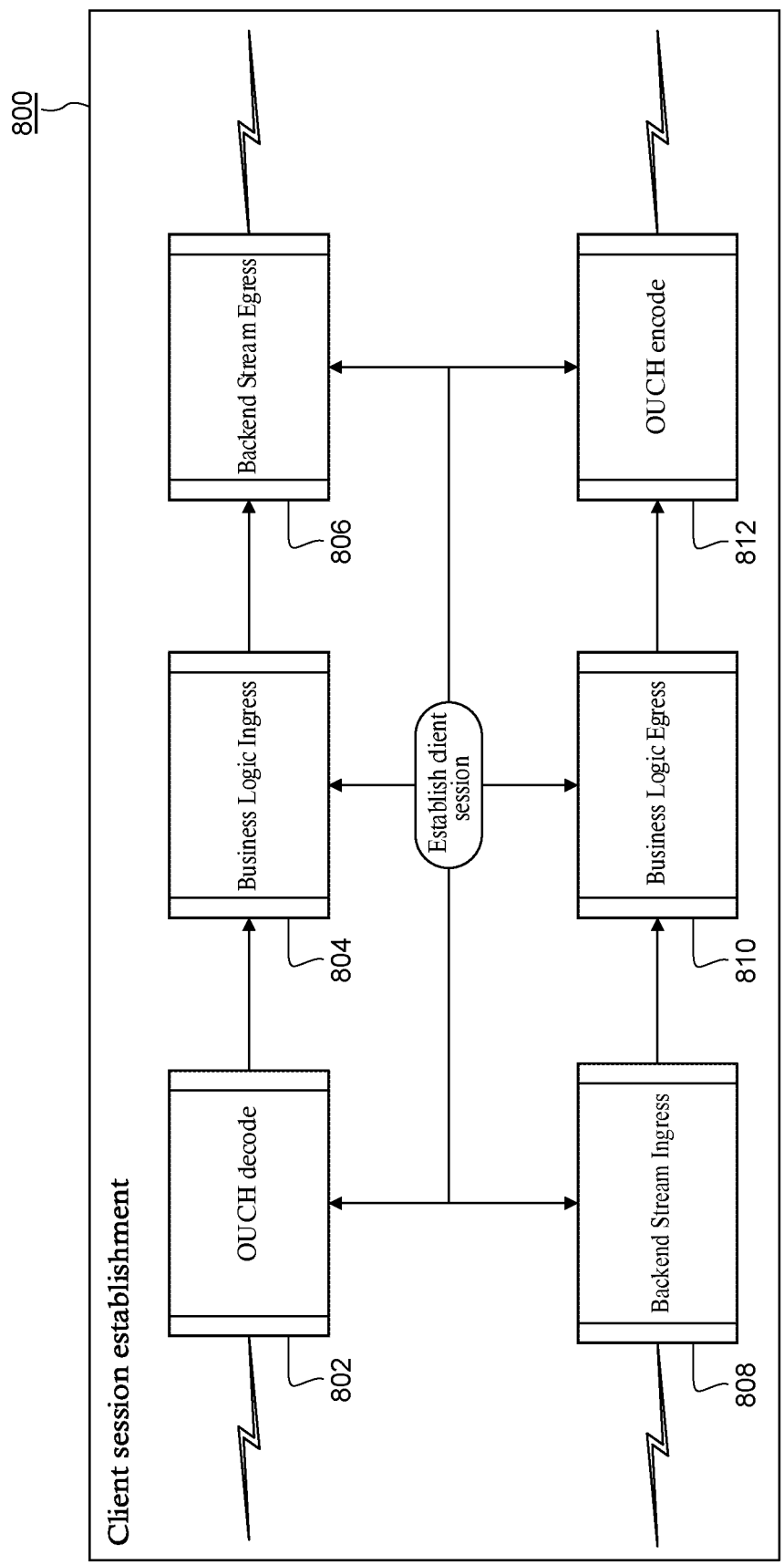
FIG. 8 illustrates an example sequence of operations for user session establishment in the gateway application shown in FIG. 6, according to some example embodiments.

Description of FIG. 8

FIG. 8 illustrates an example sequence of operations 800 for user session establishment in the gateway application shown in FIG. 6, according to some example embodiments. Operations 800 show the signaling and session attachment in the rest of the pipeline in response to the user session announcement shown in FIG. 7. The pipeline processing stages listen to the signaling indicating that a new session is created. The pipeline stages setup the appropriate subscribers to ingress messages, publisher for egress messages, and when this is done the elements acknowledge the creation of the user session. For example, upon the session being established 712, OUCH™ decode 802, Ingress business logic 804, backend stream egress 806, backend stream ingress 808, egress business logic 810, and OUCH™ encode 812 processing stages may be setup by instantiating the corresponding client objects and/or corresponding subscriber and publishers as needed. When the pipeline is completely setup, the processing of messages related to the user can be sent by the I/O service.

Figure 9:
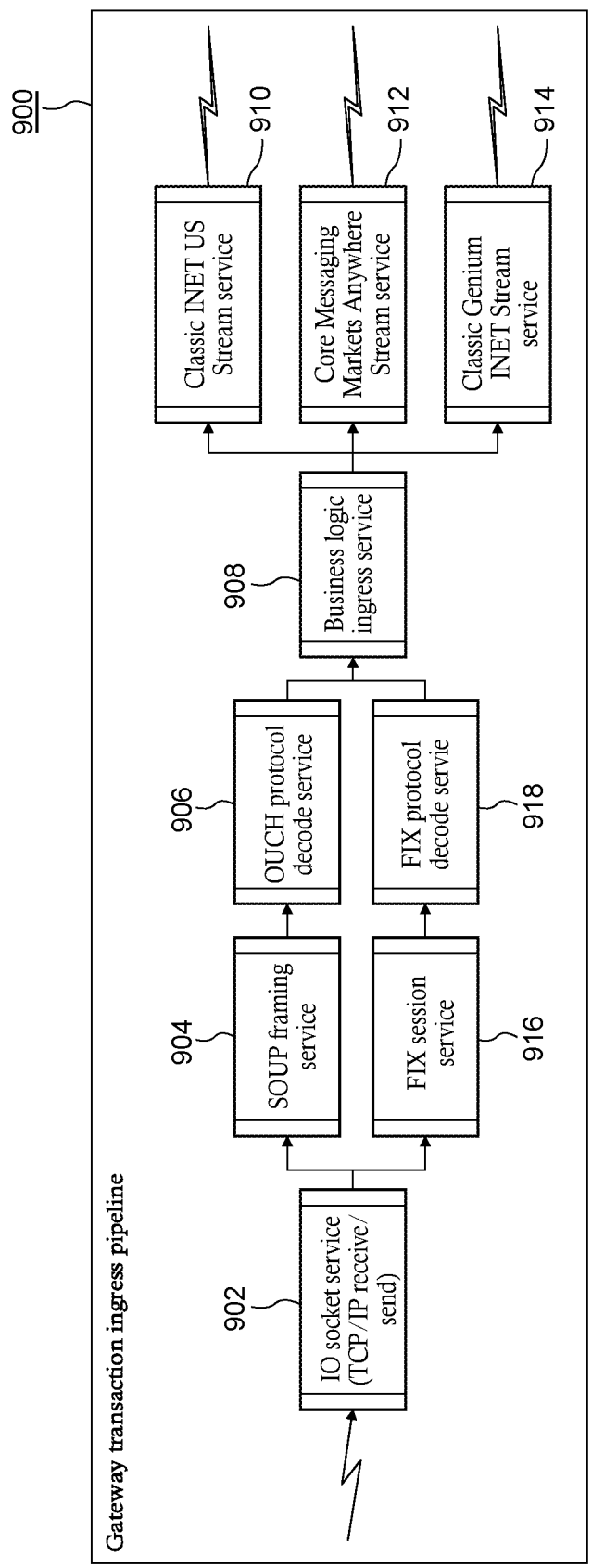
FIG. 9 illustrates an example sequence of operations for gateway transaction ingress pipeline in the gateway application shown in FIG. 6, in accordance with some example embodiments.

Description of FIG. 9

FIG. 9 illustrates an example sequence of operations 900 for gateway transaction ingress pipeline in the gateway application shown in FIG. 6, in accordance with some example embodiments. The complete inbound (and also outbound in FIG. 10) pipelines according to some example embodiments are detailed in the flow 900 and FIG. 6. The pipeline shows a number of variations which depend on the particular user specificity and backend specificity. For any given configuration and user only a straight flow may be used. For example, for a first user, the straight flow may comprise the sequence of pipeline processing stages I/O socket service 902, SOUP™ framing service 904, OUCH™ protocol decode service 906, business logic ingress service 908, and any one of stream services 910-914. For a second user, the straight flow may comprise I/O socket service 902, FIX™ session service 916, FIX™ protocol decode service 918, business logic ingress service 908, and any one of stream services 910-914. The SOUP framing service 904 maintains state per user. The ingress business logic may be directed to reduce certain risks etc., and may vary depending on the particular order. On a process level all combination of pipelines can be active at the same time as different user-specific and backend protocols can be in use at the same time.

Figure 10:
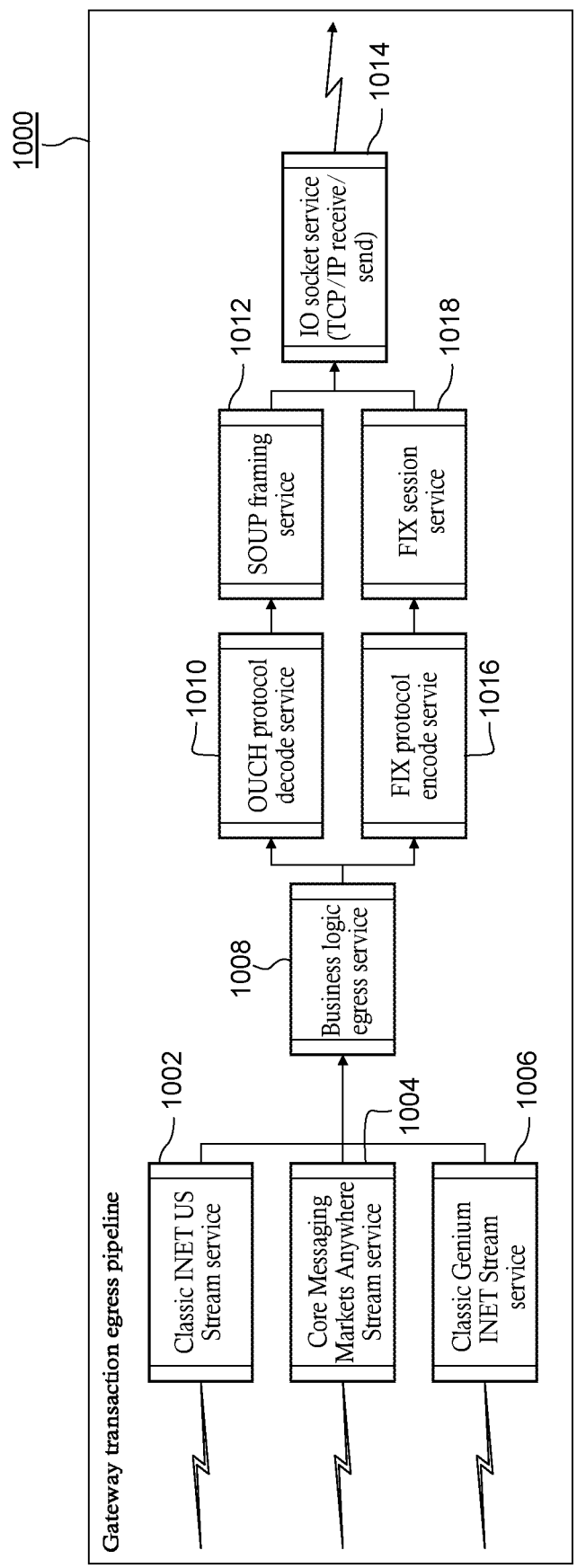
FIG. 10 illustrates an example sequence of operations for gateway transaction egress pipeline in the gateway application shown in FIG. 6, in accordance with some example embodiments.

Description of FIG. 10

FIG. 10 illustrates an example sequence of operations 1000 for gateway transaction egress pipeline in the gateway application shown in FIG. 6, in accordance with some example embodiments. Any flow 1000 may have one or more processing stage instantiations in common with the flow 900. The egress straight flow for the first user described above in relation to FIG. 9 may comprise the sequence of pipeline processing stages any one of stream services 1002-1006, business logic egress service 1008, OUCH™ protocol decode service 1010, SOUP™ framing service 1012, and I/O socket service 1014. For the second user, the egress straight flow may comprise any one of stream services 1002-1006, business logic egress service 1008, FIX™ protocol encode service 1016, FIX™ session service 1018, and I/O socket service 1014. Since the gateway may have only a single connection to the backend server infrastructure, there may be a single instance of the I/O socket service 1014 handling the outgoing user traffic to the backend for all user. The SOUP framing service 1012 performs buffering and framing per user, and may be the same instance (due to maintaining state between the ingress and egress per user) per user as the SOUP framing service 904.

Description of FIG. 11

FIG. 11 illustrates an example application, such as the electronic exchange application 116 shown in FIG. 1, being executed in a publish-subscribe framework, according to some example embodiments.

A matching engine of the electronic exchange application is shown in FIG. 11. The matching engine can be modelled as a pipeline where the different processing stages are separated for being run on the execution kernel 1102, and where parts of the pipeline are parallelized enabling asynchronous and simultaneous execution of pipeline processing stages. In particular, the order book processing stage can be decoupled from the rest of the pipeline and may be parallelized so that multiple users and/or gateways can be serviced simultaneously in that stage.

The matching engine can be decomposed into a stream I/O processing stage which accepts transactions and sends responses, a message decoding stage, a static validation and logic stage, a partitioned order book logic stage, and a message encoding stage. In contrast to the gateway application in FIG. 6 which multiplexes users and therefore can be parallelized at the level of user connections, the matching engine processes multiple order books or order book sections and can be parallelized at order book processing stage. Corresponding to these decomposed stages, client threads for a stream I/O service 1150, a message decoder service 1152, and a message encoder service 1154 may be located in CPU core 1; a static validation service 1156 and a static logic service 1158 may be located in CPU core 2; instances 1160-1166 of order book logic service may be instantiated on CPU cores 4, 5, 6, ... and N. FIG. 11 shows an allocation of the matching engine pipeline stages with both common and isolated data flows mapped to execution resources.

The message exchanges involved in the processing pipeline for each of the users (e.g., such as users 650, 652 and 654 shown in FIG. 6) can be represented by a sequence of publish-subscribe exchanges between the processing stages. The publish-subscribe sequence for user 650 may be 1104-1106-1108-1132-1112-1134 (and/or any one or more of 1116-1136, 1120-1138, 1124-1140)-1142-1130; for user 652, 1104-1106-1108-1110-1112-1114 (and/or any one or more of 1116-1118, 1120-1122, 1124-1126)-1128-1130.

The pipeline construction and the associated setup of the execution kernel objects such as sessions, clients, publishers and subscribers may be performed in a static manner in the simple case where no dynamic provisioning of execution resources are needed. On the other hand, the order book logic is partitioned and the processing of the order book groups is done in parallel.

The overlapped processing brings at least two important benefits: when the order book logic has a high degree of computational complexity, throughput can be increased with linear scaling if the order books can be segmented into independent groups which is the typical case; and when there are different types of order books with different computational complexity the processing latency of "simple" order books becomes decoupled from the processing latency of "complex" order books. This difference in complexity can be observed in markets with different types of asset classes where complex strategy orders are enabled for one class of assets but not for another class.

Description of FIG. 12

FIG. 12 illustrates an example sequence of operations 1200 for a matching engine pipeline in the electronic exchange application of FIG. 11, according to some example embodiments.

The model as such results in a "line skipping" model which enables asynchronous processing of input messages in an overlapped fashion where pipeline stages that are in parallel can complete in any order. FIG. 12 details the pipeline stages in the basic statically configured matching engine (stream I/O processing stage 1202, message decoding processing stage 1204, static validation stage 1206, static logic processing stage 1208, any one or more of the order book logic stages 1210-1214, and message encoding processing stage 1216) where some of the arrows show the decisions that can lead to the transaction not traversing the complete pipeline due to validation stages.

Description of FIG. 13

FIG. 13 illustrates an example sequence of operations 1300 for a dynamic matching engine pipeline in the electronic exchange application of FIG. 11, according to some example embodiments.

The pipeline can be extended further to enable dynamic scaling of the order book partitioning. This is achieved by adding a governor 1318 which synchronizes the addition and removal of order book logic groups 1310-1314. Except for the governor, the other processing stages of the sequence 1300 (stream I/O processing stage 1302, message decoding processing stage 1304, static validation stage 1306, static logic processing stage 1308, any one or more of the order book logic stages 1310-1314, and message encoding processing stage 1316) may be the same as corresponding stages shown in FIG. 12. FIG. 13 shows how the order book logic groups 1310-1314 are connected to the governor 1318.

The governor 1318 is the synchronizing point when changes to the processing topology is needed and the interaction and messages between the governor 1318 and the order logic groups 1310-1314 are on a different session which enable an isolated and decoupled messaging domain in relation to the normal pipeline transactions.

When adding or removing order book logic groups, the governor sends a suspend message to the required groups which then upon reception of this message stop the normal pipeline processing and sends an acknowledge to the governor that they now are in holding mode. When all required groups acknowledged the barrier (e.g. represented by the suspend message) the governor reconfigures the order book group topology and when this is completed the governor sends a resume message to the suspended groups which upon reception continues processing of the transaction pipeline.

During the reconfiguration of the pipeline only the groups that are involved in the operation need to be suspended which means that processing of transactions for the other order book groups can proceed uninterrupted.

Description of FIG. 14

FIG. 14 is a block diagram of an example computing device 1400 (which may also be referred to, for example, as a "computing device," "computer system," or "computing system") according to some embodiments. In some embodiments, the computing device 1400 includes one or more of the following: one or more processors 1402; one or more memory devices 1404; one or more network interface devices 1406; one or more display interfaces 1408; and one or more user input adapters 1410. Additionally, in some embodiments, the computing device 1400 is connected to or includes a display device 1412. As will explained below, these elements (e.g., the processors 1402, memory devices 1404, network interface devices 1406, display interfaces 1408, user input adapters 1410, display device 1412) are hardware devices (for example, electronic circuits or combinations of circuits) that are configured to perform various different functions for the computing device 1400.

In some embodiments, each or any of the processors 1402 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 1402 uses an instruction set architecture such as x86 or Advanced RISC Machine (ARM).

In some embodiments, each or any of the memory devices 1404 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 1402). Memory devices 1404 are examples of non-volatile computer-readable storage media.

In some embodiments, each or any of the network interface devices 1406 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, each or any of the display interfaces 1408 is or includes one or more circuits that receive data from the processors 1402, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 1412, which displays the image data. Alternatively or additionally, in some embodiments, each or any of the display interfaces 1408 is or includes, for example, a video card, video adapter, or graphics processing unit (GPU).

In some embodiments, each or any of the user input adapters 1410 is or includes one or more circuits that receive and process user input data from one or more user input devices (not shown in FIG. 14) that are included in, attached to, or otherwise in communication with the computing device 1400, and that output data based on the received input data to the processors 1402. Alternatively or additionally, in some embodiments each or any of the user input adapters 1410 is or includes, for example, a PS/2 interface, a USB interface, a touchscreen controller, or the like; and/or the user input adapters 1410 facilitates input from user input devices (not shown in FIG. 14) such as, for example, a keyboard, mouse, trackpad, touchscreen, etc.

In some embodiments, the display device 1412 may be a Liquid Crystal Display (LCD) display, Light Emitting Diode (LED) display, or other type of display device. In embodiments where the display device 1412 is a component of the computing device 1400 (e.g., the computing device and the display device are included in a unified housing), the display device 1412 may be a touchscreen display or non-touchscreen display. In embodiments where the display device 1412 is connected to the computing device 1400 (e.g., is external to the computing device 1400 and communicates with the computing device 1400 via a wire and/or via wireless communication technology), the display device 1412 is, for example, an external monitor, projector, television, display screen, etc.

In various embodiments, the computing device 1400 includes one, or two, or three, four, or more of each or any of the above-mentioned elements (e.g., the processors 1402, memory devices 1404, network interface devices 1406, display interfaces 1408, and user input adapters 1410). Alternatively or additionally, in some embodiments, the computing device 1400 includes one or more of: a processing system that includes the processors 1402; a memory or storage system that includes the memory devices 1404; and a network interface system that includes the network interface devices 1406.

The computing device 1400 may be arranged, in various embodiments, in many different ways. As just one example, the computing device 1400 may be arranged such that the processors 1402 include: a multi (or single)-core processor; a first network interface device (which implements, for example, WiFi, Bluetooth, NFC, etc. . . . ); a second network interface device that implements one or more cellular communication technologies (e.g., 3G, 4G LTE, CDMA, etc.); memory or storage devices (e.g., RAM, flash memory, or a hard disk). The processor, the first network interface device, the second network interface device, and the memory devices may be integrated as part of the same SOC (e.g., one integrated circuit chip). As another example, the computing device 1400 may be arranged such that: the processors 1402 include two, three, four, five, or more multi-core processors; the network interface devices 1406 include a first network interface device that implements Ethernet and a second network interface device that implements WiFi and/or Bluetooth; and the memory devices 1404 include a RAM and a flash memory or hard disk.

As previously noted, whenever it is described in this document that a software module or software process performs any action, the action is in actuality performed by underlying hardware elements according to the instructions that comprise the software module. Consistent with the foregoing, in various embodiments, each or any combination of the server infrastructure 102, client devices 108 and 110, gateway 104, computers 112 and 114, electronic exchange application 116, gateway application 126, system software 120 and 124, system software 130, client applications 132 and 134, computer 208, decomposer 218, configuration 220, processing stages 632-650, and processing stages 1152-1166, each of which will be referred to individually for clarity as a "component" for the remainder of this paragraph, are implemented using an example of the computing device 1400 of FIG. 14. In such embodiments, the following applies for each component: (a) the elements of the 1400 computing device 1400 shown in FIG. 14 (i.e., the one or more processors 1402, one or more memory devices 1404, one or more network interface devices 1406, one or more display interfaces 1408, and one or more user input adapters 1410), or appropriate combinations or subsets of the foregoing) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices 1404 (e.g., in various embodiments, in a volatile memory device such as a RAM or an instruction register and/or in a non-volatile memory device such as a flash memory or hard disk) and all actions described herein as performed by the software modules are performed by the processors 1402 in conjunction with, as appropriate, the other elements in and/or connected to the computing device 1400 (i.e., the network interface devices 1406, display interfaces 1408, user input adapters 1410, and/or display device 1412); (c) alternatively or additionally, to the extent it is described herein that the component processes and/or otherwise handles data, in some embodiments, such data is stored in the memory devices 1404 (e.g., in some embodiments, in a volatile memory device such as a RAM and/or in a non-volatile memory device such as a flash memory or hard disk) and/or is processed/handled by the processors 1402 in conjunction, as appropriate, the other elements in and/or connected to the computing device 1400 (i.e., the network interface devices 1406, display interfaces 1408, user input adapters 1410, and/or display device 1412); (d) alternatively or additionally, in some embodiments, the memory devices 1402 store instructions that, when executed by the processors 1402, cause the processors 1402 to perform, in conjunction with, as appropriate, the other elements in and/or connected to the computing device 1400 (i.e., the memory devices 1404, network interface devices 1406, display interfaces 1408, user input adapters 1410, and/or display device 1412), each or any combination of actions described herein as performed by the component and/or by any software modules described herein as included within the component.

The hardware configurations shown in FIG. 14 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 14, (e) via other hardware arrangements, architectures, and configurations, and/or via combinations of the technology described in (a) through (e).

Technical Advantages of Described Subject Matter

Certain example embodiments may provide improved application execution times and better throughput for certain applications, such as, but not limited to, electronic exchange platforms. According to embodiments, systems and methods are provided for executing a multiprocess and/or multi-threaded application on uni- or multi-processor platforms, by asynchronously and simultaneously executing pipeline processing stages of the application in order to achieve faster completion of application tasks and higher throughput by reducing bottlenecks in the pipeline processing. In this manner, embodiments may achieve superscalar performance in contrast to the conventional techniques of processing transactions.

Certain example embodiments also reduce the amount of data and messaging traffic on the internal communication infrastructure, thereby further improving application execution and task completion times. Indeed, it was observed in experiments that the use of some conventional publish-subscribe frameworks for the example electronic exchange application was not feasible due to the resulting data bandwidth requirement on the shared medium, both on network and sequencer level, and also from an overhead perspective. It was also observed that when the conventional publish-subscribe framework was used, the resulting propagation delay and throughput were not adequate and would not scale when multiple processes and hosts are added. In comparison, among other aspects, in some example embodiments, the use of lock free queues for messages and passing of a pointer to a shared memory location to multiple processors or processor cores drastically reduce the congestion for internal messaging.

It is also observed that whereas current order gateway applications and matching engine implementations are monolithic in implementation as traditional imperative approaches where the complete processing of input is carried out as a single call chain for any given input are the only manner of implementation to meet the required performance level, certain example embodiments are substantially faster (e.g., faster average transaction completion times for buy/sell orders). This improvement may be at least partly due to the characteristic that, unlike example embodiments, the conventional monolithic implementation prohibits simultaneous processing of different data flows within the gateway or matching engine as the different flows do have processing stages which are shared between them and hence cannot be parallelized.

Additional Applications of Described Subject Matter

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the technology, and does not imply that the illustrated process is preferred.

Various forms of computer readable media/transmissions may be involved in carrying data (e.g., sequences of instructions) to a processor. For example, data may be (i) delivered from a memory to a processor; (ii) carried over any type of transmission medium (e.g., wire, wireless, optical, etc.); (iii) formatted and/or transmitted according to numerous formats, standards or protocols, such as Ethernet (or IEEE 802.3), ATP, Bluetooth, and TCP/IP, TDMA, CDMA, 3G, etc.; and/or (iv) encrypted to ensure privacy or prevent fraud in any of a variety of ways well known in the art.

Selected Terminology

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. When it is described in this document that an action "may," "can," or "could" be performed, that a feature or component "may," "can," or "could" be included in or is applicable to a given context, that a given item "may," "can," or "could" possess a given attribute, or whenever any similar phrase involving the term "may," "can," or "could" is used, it should be understood that the given action, feature, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

While the technology has been described in connection with what is presently considered to be the most practical and preferred embodiment, it is to be understood that the technology is not to be limited to the disclosed embodiment, but on the contrary, is intended to cover various modifications and equivalent arrangements.

The invention claimed is:
1. An electronic exchange system, comprising:
a shared memory;
a communication infrastructure; and
a processing system comprising a plurality of processing resources coupled by the communication infrastructure to the shared memory,
wherein the processing system is configured to perform operations comprising:
executing, on each of the processing resources, at least one pipeline processing stage of a plurality of pipeline stages of a processing pipeline of a gateway application;
providing for communication between any two of the plurality of pipeline stages via publish-subscribe messages using the shared memory;
in response to a received data message, creating a session for processing the data message in the gateway application;
in response to creating the session:
registering, in the session, each of the plurality of pipeline stages of the processing pipeline of the application as a publisher and/or subscriber; and
completing processing of the data message in the gateway application by processing the data message in each of the plurality of the pipeline stages of the processing pipeline of the gateway application to generate an output message, wherein communication between the plurality of pipeline stages during said processing the data message occurs according to said publisher and/or subscriber registrations in the session; and
transmitting the output message to a matching engine.

2. The electronic exchange system according to claim 1, wherein the processing system is further configured to:
execute each of the plurality of pipeline stages as a thread;
associate with the session, a subscriber and/or a publisher for each of the pipeline stages; and
perform said processing the data message by causing messages to be exchanged between respective pairs of publishers and subscribers among the associated publishers and the associated subscribers.

3. The electronic exchange system according to claim 2, wherein the processing system is further configured to:
instantiate a control session;
subscribe each of the pipeline stages to the control session; and
provide for signaling one or more predetermined events to the plurality of pipeline stages by publishing to the control session.

4. The electronic exchange system according to claim 2, wherein the processing system is further configured to perform said causing messages to be exchanged between respective pairs of publishers and subscribers by storing one of the messages to an area in the shared memory, and providing a pointer to the area to at least one of the subscribers.

5. The electronic exchange system according to claim 2, wherein the processing system is further configured to configure the area as a lock free queue.

6. The electronic exchange system according to claim 2, wherein the processing system is further configured to:
receive a program code; and
decompose the program code to obtain the plurality of pipeline stages, each comprising an ingress message interface and an egress message interface.

7. The electronic exchange system according to claim 6, wherein the processing system is further configured to perform said decomposing in accordance with one or more configuration parameters.

8. The electronic exchange system according to claim 6, wherein the processing system is further configured to determine an arrangement of the plurality of pipeline stages to the plurality of processing resources.

9. The electronic exchange system according to claim 8, wherein the processing system is further configured to determine the arrangement based on the ingress message interface and the egress message interface of the pipeline stages.

10. The electronic exchange system according to claim 1, wherein the processing system is further configured to perform said processing the data message by accessing a matching engine with respect to the data message.

11. The electronic exchange system according to claim 10, wherein the processing system is further configured to perform said processing the data message in a plurality of the pipeline stages by said accessing the matching engine in parallel for said trade request and another trade request.

12. The electronic exchange system according to claim 11, wherein the processing system is further configured to dynamically determine a number of instances of a pipeline stage for said accessing the matching engine.

13. A method of processing a data message on an electronic exchange system having a shared memory, a communication infrastructure and a processing system comprising a plurality of processing resources coupled by the communication infrastructure to the shared memory, the method comprising:
   executing, on each of the processing resources, at least one pipeline processing stage of a plurality of pipeline stages of a processing pipeline of a gateway application;
   providing for communication between any two of the plurality of pipeline stages via publish-subscribe messages using the shared memory;
   in response to a received data message, creating a session for processing the data message in the gateway application;
   in response to creating the session:
      registering, in the session, each of the plurality of pipeline stages of the processing pipeline of the gateway application as a publisher and/or subscriber; and
      completing processing of the data message in the gateway application by processing the data message in each of the plurality of the pipeline stages of the processing pipeline of the gateway application to generate an output message, wherein communication between the plurality of pipeline stages during said processing the data message occurs according to said publisher and/or subscriber registrations in the session; and
   transmitting the output message to a matching engine.

14. The method according to claim 13, wherein the method further comprises:
   executing each of the plurality of pipeline stages as a thread;
   associating with the session, a subscriber and/or a publisher for each of the pipeline stages; and
   performing said processing the data message by causing messages to be exchanged between respective pairs of publishers and subscribers among the associated publishers and the associated subscribers.

15. The method according to claim 13, further comprising causing messages to be exchanged between respective pairs of publishers and subscribers by storing one of the messages to an area in the shared memory, and providing a pointer to the area to at least one of the subscribers.

16. A non-transitory computer-readable storage medium storing instructions which, when executed by a processing system comprising a plurality of processing resources coupled by a communication infrastructure to a shared memory, causes the processing system of an electronic exchange system to perform operations comprising:
   executing, on each of the processing resources, at least one pipeline processing stage of a plurality of pipeline stages of a processing pipeline of a gateway application;
   providing for communication between any two of the plurality of pipeline stages via a publish-subscribe messages using the shared memory;
   in response to a received data message, creating a session for processing the data message in the gateway application;
   in response to creating the session:
      registering, in the session, each of the plurality of pipeline stages of the processing pipeline of the gateway application as a publisher and/or subscriber; and
      completing processing of the data message in the gateway application by processing the data message in each of the plurality of the pipeline stages of the processing pipeline of the gateway application to generate an output message, communication between the plurality of pipeline stages during said processing the data message occurring according to said publisher and/or subscriber registrations in the session; and
   transmitting the output message to a matching engine.

* * * * *